(12) United States Patent  
Sayama

(10) Patent No.: US 8,172,330 B2  
(45) Date of Patent: May 8, 2012

(54) HEADREST AND VEHICLE SEAT PROVIDED WITH THE SAME

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 361 days.

(21) Appl. No.: 12/525,618

(22) PCT Filed: Feb. 5, 2008

(86) PCT No.: PCT/JP2008/051880  
§ 371 (c)(1),  
(2), (4) Date: Aug. 3, 2009

(87) PCT Pub. No.: WO2008/096766  
PCT Pub. Date: Aug. 14, 2008

(65) Prior Publication Data  
US 2010/0026074 A1   Feb. 4, 2010

(30) Foreign Application Priority Data

Feb. 5, 2007   (JP) .................................. 2007-026171  
Mar. 31, 2007   (JP) .................................. 2007-095908

(51) Int. Cl.  
*B60N 2/48* (2006.01)  
(52) U.S. Cl. ........................................ 297/408; 297/403  
(58) Field of Classification Search .................. 297/408, 297/403  
See application file for complete search history.

(56) References Cited

U.S. PATENT DOCUMENTS

| 5,669,668 | A | * | 9/1997 | Leuchtmann | 297/408 |
| 6,129,421 | A | * | 10/2000 | Gilson et al. | 297/408 |
| 6,302,485 | B1 | * | 10/2001 | Nakane et al. | 297/408 |
| 7,306,287 | B2 | * | 12/2007 | Linardi et al. | 297/410 |
| 2007/0132300 | A1 | * | 6/2007 | Toba | 297/408 |

FOREIGN PATENT DOCUMENTS

| DE | 10256642 B3 | 6/2004 |
| JP | 01-164310 A | 6/1989 |
| JP | 07-011951 U | 2/1995 |
| JP | 2002-199960 A | 7/2002 |
| JP | 2005-349915 A | 12/2005 |
| WO | WO 2005/120894 A1 | 12/2005 |

* cited by examiner

*Primary Examiner* — David Dunn  
*Assistant Examiner* — Erika Garrett  
(74) *Attorney, Agent, or Firm* — Drinker Biddle & Reath LLP

(57) ABSTRACT

A headrest and associated vehicle seat are provided that has excellent versatility and thin shape, and can be tilted lightly and reliably from a head support state to a storage state by reducing an operation load. The headrest includes a support member mounted on the upper part of a backrest seat, a frame rotatably engaged with the support member, a frame urging elements for urging the frame, and a lock mechanism provided between the frame and the support member. The lock mechanism includes locking members and disposed on the support member and formed with engagement groove parts and, a movable operation lever having concave parts formed, and fixing members pivotally supported on the frame and disposed permitting crossing engagement with and disengaged from the engagement groove parts and along with the movement of the operation lever.

26 Claims, 16 Drawing Sheets

HEADREST AND VEHICLE SEAT PROVIDED WITH THE SAME

CROSS-REFERENCE TO RELATED APPLICATIONS

This application is the U.S. national phase of the International Patent Application No. PCT/JP2008/051880 filed Feb. 5, 2008, which claims the benefit of Japanese Application No. 2007-026171, filed Feb. 5, 2007, and Japanese Application No. 2007-095908, filed Mar. 31, 2007, the entire contents of which are incorporated herein by reference.

This application is also related to the subject matter of International Patent Application No. PCT/JP2008/051879 filed Feb. 5, 2008.

BACKGROUND

The present invention relates to a headrest and a vehicle seat provided with the headrest. More particularly, it relates to a headrest capable of being in a head support state in which the headrest is raised with respect to a backrest seat and being tilted from the head support state to a storage state, and a vehicle seat provided with the headrest.

Generally, on the upper part of a backrest seat of a vehicle seat, a headrest for protecting the passenger's head is mounted. Conventionally, there has been publicly known a technique in which the lower parts of a pillar of the headrest are attached to a transverse rod extending in the right-and-left direction in the backrest seat so as to be rotatable in the front-and-rear direction, the pillar is attached so as to be movable in the right-and-left direction, and the headrest is tilted to the rear and stored after being moved transversely (see Japanese Unexamined Utility Model Application Publication No. 7-11951 ("the '951 Publication")).

Also, there has been proposed a technique in which a headrest includes a pillar having a transverse shaft part and mounted on the upper part of a seat back; a headrest main body the lower part side of which is rotatably provided in the transverse shaft part of the pillar; and a tilting mechanism incorporated in the headrest main body to tilt the headrest main body backward, and the tilting mechanism includes a headrest urging elements for urging the upper part of the headrest main body to the rear side; a lock plate provided on the transverse shaft part of the pillar and having a first locking part; a latch provided on the headrest main body and having a second locking part capable of being locked to the first locking part of the lock plate; a latch urging elements for urging the latch so as to lock the second locking part to the first locking part of the lock plate when the headrest main body is in an raised state in which the headrest main body is approximately vertical; and an actuator for unlocking the second locking part of the latch from the first locking part of the lock plate against the urging force of the latch urging elements (Japanese Unexamined Patent Application Publication No. 2005-349915 ("the '915 Publication")).

Furthermore, there has been proposed a technique in which in a tiltable headrest in which a bracket can be moved between a folded position and an upright position, a concave part is formed in a lock reciprocating member and a lock member respectively, and the lock reciprocating member can be made slidable between a lock position and an unlock position by a spring (International Patent Publication No. WO2005/120894A1 ("the '894 Publication")).

The publicly known technique described in the '951 Publication has a problem in that because the rotation supporting point of the headrest is present in the upper part of the backrest seat under the headrest, the headrest rotates backward greatly together with the pillar and therefore the displacement thereof is large, so that the space occupied at the storage time is large.

That is to say, when the headrest is tilted to the rear, one headrest fully projects to the rear side of the backrest seat. Also, this technique has a problem in that a pillar movement grooves must be formed in the upper part of the backrest seat, so that the construction is complicated, and also the backrest seat cannot be used in common with another backrest seat.

The publicly known technique described in the '915 Publication has a problem in that although the entire of the tilting mechanism of the headrest can be accommodated in the headrest main body, and the headrest has excellent versatility, since the first locking part of the lock plate and the second locking part provided on the latch to be locked to the first locking part are used, the lock plate and the latch are arranged in the tiltable direction of the headrest, so that some degree of size must be secured in the front-and-rear direction, and therefore there is a limit to the thinning of the headrest.

In the publicly known technique described in the '894 Publication, the concave part is formed in the lock reciprocating member and the lock member respectively, and the lock reciprocating member can be made slidable between a lock position and an unlock position by the spring. However, since the lock position and the unlock position are switched over by two members of the lock reciprocating member and the lock member, a spring force urging the bracket toward the folding direction is directly applied to the lock reciprocating member and the lock member. Therefore, the reciprocating motion of the lock reciprocating member is sometimes difficult to perform smoothly. Also, in the case where a plurality of lock members are present, the lock reciprocating member and all of the lock members are made slidable between the lock position and the unlock position by one lock reciprocating member, so that the size of the lock reciprocating member increases, so that this headrest has a disadvantage that a greater load is applied to the lock reciprocating member.

Also, in any of the publicly known techniques, there has not been disclosed a technique in which a play of a lock mechanism of the headrest and the regulation of rotating of the headrest are configured in relation with the lock mechanism.

SUMMARY

An object of the present invention is to provide a headrest that has excellent versatility and thin shape, and can be tilted lightly from a head support state to a storage state by reducing an operation load, and a vehicle seat provided with this headrest.

Also, another object of the present invention is to provide a headrest capable of preventing a play of a lock mechanism and reliably regulating the rotation of the headrest, and a vehicle seat provided with this headrest.

To solve the above problems, according to an embodiment of the invention, in a headrest capable of being in a head support state in which the headrest is raised with respect to a backrest seat and being tilted from the head support state to a storage state, the headrest includes a support member mounted on the upper part of the backrest seat; a frame engaged rotatably with the support member; a frame urging elements for urging the frame to one side; and a lock mechanism provided between the frame and the support member, where the lock mechanism includes a locking member disposed on the support member and formed with an engagement groove part; an operation lever having a concave part formed so as to be directed toward the support member side and being movable; and a fixing member pivotally supported on the frame rotatably and disposed so as to be capable of being crossingly engaged with and disengaged from the engagement groove part of the locking member along with the movement of the operation lever, and the engagement groove part of the locking member is formed so that the upper end side thereof is narrow.

To solve the above problems, according to an embodiment of the invention, in a headrest capable of being in a head support state in which the headrest is raised with respect to a backrest seat and being tilted from the head support state to a storage state, the headrest includes a pillar having a transverse shaft part and mounted on the upper part of the backrest seat; a headrest frame rotatably engaged with the transverse shaft part of the pillar by combining a main frame and a sub frame; a headrest frame urging elements for urging the headrest frame to one side; and a lock mechanism provided between the headrest frame and the pillar, and is characterized in that the lock mechanism includes a latch plate disposed on the transverse shaft part of the pillar and formed with an engagement groove part along the transverse shaft part; a ratchet lever provided with an engagement concave part formed so as to be directed toward the pillar side and sliding in the transverse direction; and a ratchet one end side of which is engaged with the engagement concave part of the ratchet lever and the other end side of which can be engaged crossingly with the engagement groove part of the latch plate, and an engagement position at which the ratchet is positioned in the engagement groove part of the latch plate and a disengagement position at which the ratchet comes off the engagement groove part can be switched over, and the engagement groove part of the latch plate is formed so that the upper end side thereof is narrow.

As described above, when the headrest is kept in the head support state in which the headrest is raised with respect to a backrest seat and is tilted from the head support state to the storage state, in the present invention, as the lock mechanism, the latch plate and the ratchet are used, and the engagement position and the disengagement position are switched over via the ratchet capable of being engaged crossingly with the engagement groove part of the latch plate. Therefore, the lock mechanism itself can be configured so as to be compact without requiring a wide width.

Also, since the engagement groove part of the latch plate is formed so that the upper end side thereof is narrow, the contact point of the latch plate with the ratchet separates from the transverse shaft part of the pillar, so that the releasing load at the time when the lock is released can be decreased.

In the above-described configuration, and according to an embodiment of the invention, it is preferable that the latch plate be in contact with the ratchet on the upper end side formed so as to be narrow of the engagement groove part, and the distance from the transverse shaft part of the pillar to the contacting portion be longer than the distance from the transverse shaft part of the pillar to any other portion of the ratchet positioned in the engagement groove part.

By the above-described configuration, the contact point of the ratchet with the latch plate is made the upper end side of the engagement groove part of the latch plate, so that the contact point separates from the transverse shaft part of the pillar. Therefore, when the ratchet moves from the engagement position to the disengagement position (when the lock is released), the releasing load can be decreased, and thereby the adjustment of releasing load can be made.

To solve the above problems, according to an embodiment of the invention, in a headrest capable of being in a head support state in which the headrest is raised with respect to a backrest seat and being tilted from the head support state to a storage state, the headrest includes a pillar having a transverse shaft part and mounted on the upper part of the backrest seat; a headrest frame rotatably engaged with the transverse shaft part of the pillar by combining a main frame and a sub frame; a headrest frame urging elements for urging the headrest frame to one side; and a lock mechanism provided between the headrest frame and the pillar, and is characterized in that the lock mechanism includes a latch plate disposed on the transverse shaft part of the pillar and formed with an engagement groove part along the transverse shaft part; a ratchet lever provided with an engagement concave part formed so as to be directed toward the pillar side and sliding in the transverse direction; and a ratchet one end side of which is engaged with the engagement concave part of the ratchet lever and the other end side of which can be engaged crossingly with the engagement groove part of the latch plate, and on the outer peripheral surface of the latch plate, a stopper part coming into contact with the ratchet when the headrest is rotated and stored is formed.

By the above-described configuration, when the headrest is stored, the ratchet comes into contact with the stopper part, so that the further rotating of the ratchet is inhibited. Since the rotation can be inhibited by the ratchet and the latch plate, and is not inhibited by the main frame, the thickness of the main frame can be decreased.

To solve the above problems, according to an embodiment of the invention, in a headrest capable of being in a head support state in which the headrest is raised with respect to a backrest seat and being tilted from the head support state to a storage state, the headrest includes a pillar having a transverse shaft part and mounted on the upper part of the backrest seat; a headrest frame rotatably engaged with the transverse shaft part of the pillar by combining a main frame and a sub frame; a headrest frame urging elements for urging the headrest frame to one side; and a lock mechanism provided between the headrest frame and the pillar, and is characterized in that the lock mechanism includes a latch plate disposed on the transverse shaft part of the pillar and formed with an engagement groove part along the transverse shaft part; a ratchet lever provided with an engagement concave part formed so as to be directed toward the pillar side and sliding in the transverse direction; and a ratchet one end side of which is engaged with the engagement concave part of the ratchet lever and the other end side of which can be engaged crossingly with the engagement groove part of the latch plate, and on the surface on the lower side of the latch plate, a stopper part consisting of a pushing-out part which juts out is formed.

By the above-described configuration, when the headrest is tilted and stored, the stopper part abuts on and supports a side part on the lower part side of the main frame, by which the rotation can be regulated. By providing the stopper part in this manner, the tilt angle can be set by setting the formation position of the stopper part as predetermined.

In the above-described configuration, according to an embodiment of the invention, it is preferable that when the ratchet engages with the engagement groove part, the bottom part of the engagement groove part of the latch plate be positioned above the end part of the ratchet. By this configuration, since the rotation of the ratchet is inhibited at the position of the groove bottom, the distance of the groove bottom of the engagement groove part of the latch plate is shorter than the length from the rotation axis of the ratchet to the end part, so that the groove bottom can play a role as a rotation stopper for the ratchet.

In the above-described configuration, according to an embodiment of the invention, it is preferable that at least two latch plates be formed, and the engagement groove part of at least one latch plate be formed so that the upper end side thereof is narrow. That is to say, if the upper end side of at least one latch plate is formed so as to be narrow, as described above, the contact point of the ratchet with the latch plate separates from the transverse shaft part of the pillar, so that the releasing load at the time when the lock is released can be decreased.

In the above-described configuration, according to an embodiment of the invention, the configuration can also be made such that at least two latch plates are formed, and the engagement groove part of the latch plate is formed so that the width thereof is different. By changing the width of the engagement groove part in this manner, the ratchet is allowed to enter easily into and engage easily with the engagement groove part of the latch plate by the engagement groove part having a wider width of the latch plate, and a play between the ratchet and the latch plate can be decreased by the engagement groove part having a narrower width of the latch plate.

In the above-described configuration, according to an embodiment of the invention, the configuration is preferably made such that the headrest further includes the outer peripheral surface of the latch plate on which the ratchet slides, and a stopper part formed in the engagement groove part of the latch plate, capable of making contact with the ratchet before the ratchet enters into the engagement groove part, and the ratchet enters into and engages with the engagement groove part of the latch plate after coming into contact with the stopper part. Thereby, the ratchet can be guided so as to engage with the engagement groove part of the latch plate from the height direction.

In the above-described configuration, according to an embodiment of the invention, the latch plate is preferably formed with a shaft insertion hole for inserting the shaft. Thereby, the headrest frame urging elements can be urged from the outside of the headrest frame, and also a compact urging elements formed so as to be in close contact with the frame can be configured.

In the above-described configuration, according to an embodiment of the invention, the configuration can be made such that the lock mechanism has a ratchet lever urging elements for urging the ratchet lever so that the ratchet is urged in the engagement groove part direction of the latch plate, and by operating the ratchet lever against the ratchet lever urging elements, the ratchet is taken away from the engagement groove part of the latch plate. Thus, at the normal time, the ratchet lever is urged by the ratchet lever urging elements in the direction such that the ratchet is engaged with the engagement groove part of the latch plate. When the ratchet lever is operated against the ratchet lever urging elements, the ratchet comes off the engagement groove part, and the headrest frame is tilted to the storage state by the headrest frame urging elements. Therefore, the lock can be released by one operation (one action).

To solve the above problems, according to an embodiment of the invention, in a vehicle seat provided with a headrest capable of being in a head support state in which the headrest is raised with respect to a backrest seat and being tilted from the head support state to a storage state, the vehicle seat is characterized in that the headrest includes a pillar having a transverse shaft part and mounted on the upper part of the backrest seat; a headrest frame rotatably engaged with the transverse shaft part of the pillar by combining a main frame and a sub frame; a headrest frame urging elements for urging the headrest frame to one side; and a lock mechanism provided between the headrest frame and the pillar, the lock mechanism includes a latch plate disposed on the transverse shaft part of the pillar and formed with an engagement groove part along the transverse shaft part; a ratchet lever provided with an engagement concave part formed so as to be directed toward the pillar side and sliding in the transverse direction; and a ratchet one end side of which is engaged with the engagement concave part of the ratchet lever and the other end side of which can be engaged crossingly with the engagement groove part of the latch plate, an engagement position at which the ratchet is positioned in the engagement groove part of the latch plate and a disengagement position at which the ratchet comes off the engagement groove part can be switched over, and the engagement groove part of the latch plate is formed so that the upper end side thereof is narrow.

In the above-described configuration, according to an embodiment of the invention, it is preferable that the latch plate be in contact with the ratchet on the upper end side formed so as to be narrow of the engagement groove part, and the distance from the transverse shaft part of the pillar to the contacting portion be longer than the distance from the transverse shaft part of the pillar to any other portion of the ratchet positioned in the engagement groove part.

To solve the above problems, according to an embodiment of the invention, in a vehicle seat provided with a headrest capable of being in a head support state in which the headrest is raised with respect to a backrest seat and being tilted from the head support state to a storage state, the vehicle seat is characterized in that the headrest includes a pillar having a transverse shaft part and mounted on the upper part of the backrest seat; a headrest frame rotatably engaged with the transverse shaft part of the pillar by combining a main frame and a sub frame; a headrest frame urging elements for urging the headrest frame to one side; and a lock mechanism provided between the headrest frame and the pillar, the lock mechanism includes a latch plate disposed on the transverse shaft part of the pillar and formed with an engagement groove part along the transverse shaft part; a ratchet lever provided with an engagement concave part formed so as to be directed toward the pillar side and sliding in the transverse direction; and a ratchet one end side of which is engaged with the engagement concave part of the ratchet lever and the other end side of which can be engaged crossingly with the engagement groove part of the latch plate, and on the outer peripheral surface of the latch plate, a stopper part coming into contact with the ratchet when the headrest is rotated and stored is formed.

To solve the above problems, according to an embodiment of the invention, in a vehicle seat provided with a headrest capable of being in a head support state in which the headrest is raised with respect to a backrest seat and being tilted from the head support state to a storage state, the vehicle seat is characterized in that the headrest includes a pillar having a transverse shaft part and mounted on the upper part of the backrest seat; a headrest frame rotatably engaged with the transverse shaft part of the pillar by combining a main frame and a sub frame; a headrest frame urging elements for urging the headrest frame to one side; and a lock mechanism provided between the headrest frame and the pillar, the lock mechanism includes a latch plate disposed on the transverse shaft part of the pillar and formed with an engagement groove part along the transverse shaft part; a ratchet lever provided with an engagement concave part formed so as to be directed toward the pillar side and sliding in the transverse direction; and a ratchet one end side of which is engaged with the engagement concave part of the ratchet lever and the other end side of which can be engaged crossingly with the engagement groove part of the latch plate, and on the surface on the lower side of the latch plate, a stopper part consisting of a pushing-out part which juts out is formed.

According to the above-described vehicle seat, a vehicle seat provided with the above-described headrest function can be provided.

According to the present invention, there can be provided a headrest that has excellent versatility and thin shape, and can be tilted lightly from a head support state to a storage state by reducing an operation load, and a vehicle seat provided with this headrest. Also, according to the present invention, a play of a lock mechanism can be prevented and the rotation of the headrest can be regulated reliably.

When the head support state in which the headrest is raised with respect to the backrest seat is formed and when the storage state is formed by tilting the headrest from the head support state, in the present invention, as the lock mechanism, the latch plates and the ratchets are used. Also, the engagement position and the disengagement position are switched over via the ratchet capable of engaging crossingly with the engagement groove part of the latch plate. Therefore, the lock mechanism itself can be configured so as to be compact without requiring a wide width.

In an above-discussed embodiment of the invention, since the engagement groove part of the locking member is formed so that the upper end side thereof is narrow, the contact point of the ratchet with the latch plate separates from the transverse shaft part of the pillar. Therefore, the releasing load at the time when the lock is released can be decreased.

Also, by changing the width of the engagement groove part, the ratchet is allowed to enter easily into and engage easily with the engagement groove part of the latch plate by the engagement groove part having a wider width of the latch plate, and a play between the ratchet and the latch plate can be decreased by the engagement groove part having a narrower width of the latch plate.

In an above-discussed embodiment of the invention, the contact point of the ratchet with the latch plate is made the upper end side of the engagement groove part of the latch plate, so that the contact point separates from the transverse shaft part of the pillar. Therefore, when the ratchet moves from the engagement position to the disengagement position (when the lock is released), the releasing load can be decreased, and thereby the adjustment of releasing load can be made.

In an above-discussed embodiment of the invention, when the headrest is stored, the ratchet comes into contact with the stopper part, so that the further rotating of the ratchet is inhibited. Since the rotation can be inhibited by the ratchet and the latch plate, and is not inhibited by the main frame, the thickness of the main frame can be decreased.

In an above-discussed embodiment of the invention, when the headrest is tilted and stored, the stopper part abuts on and supports the side part on the lower part side of the main frame, by which the rotation can be regulated. By providing the stopper part in this manner, the tilt angle can be set by setting the formation position of the stopper part as predetermined.

In an above-discussed embodiment of the invention, since the rotation of the ratchet is inhibited at the position of the groove bottom, the distance of the groove bottom of the engagement groove part of the latch plate is shorter than the length from the rotation axis of the ratchet to the end part, so that the groove bottom can play a role as a rotation stopper for the ratchet.

In an above-discussed embodiment of the invention, if the upper end side of at least one latch plate is formed so as to be narrow, as described above, the contact point of the ratchet with the latch plate separates from the transverse shaft part of the pillar, so that the releasing load at the time when the lock is released can be decreased.

In an above-discussed embodiment of the invention, by changing the width of the engagement groove part, the ratchet is allowed to enter easily into and engage easily with the engagement groove part of the latch plate by the engagement groove part having a wider width of the latch plate, and a play between the ratchet and the latch plate can be decreased by the engagement groove part having a narrower width of the latch plate.

In an above-discussed embodiment of the invention, the ratchet can be guided so as to engage with the engagement groove part of the latch plate from the height direction.

In an above-discussed embodiment of the invention, the headrest frame urging elements can be urged from the outside of the headrest frame, and also a compact urging elements formed so as to be in close contact with the frame can be configured.

In an above-discussed embodiment of the invention, the lock can be released by one operation (one action).

In an above-discussed embodiment of the invention, the vehicle seat provided with the headrest in accordance with the present invention can be provided.

BRIEF DESCRIPTION OF THE DRAWINGS

The invention is described below with reference to various embodiments of the invention illustrated in the drawings and discussed in the following sections.

DETAILED DESCRIPTION OF THE EMBODIMENTS

Various embodiments of the present invention will now be described with reference to the accompanying drawings. The members, arrangements, and the like explained below do not restrict the present invention, and needless to say, can be changed variously based on the teachings of the present invention as would be understood by one of ordinary skill in the art.

Figure 1:
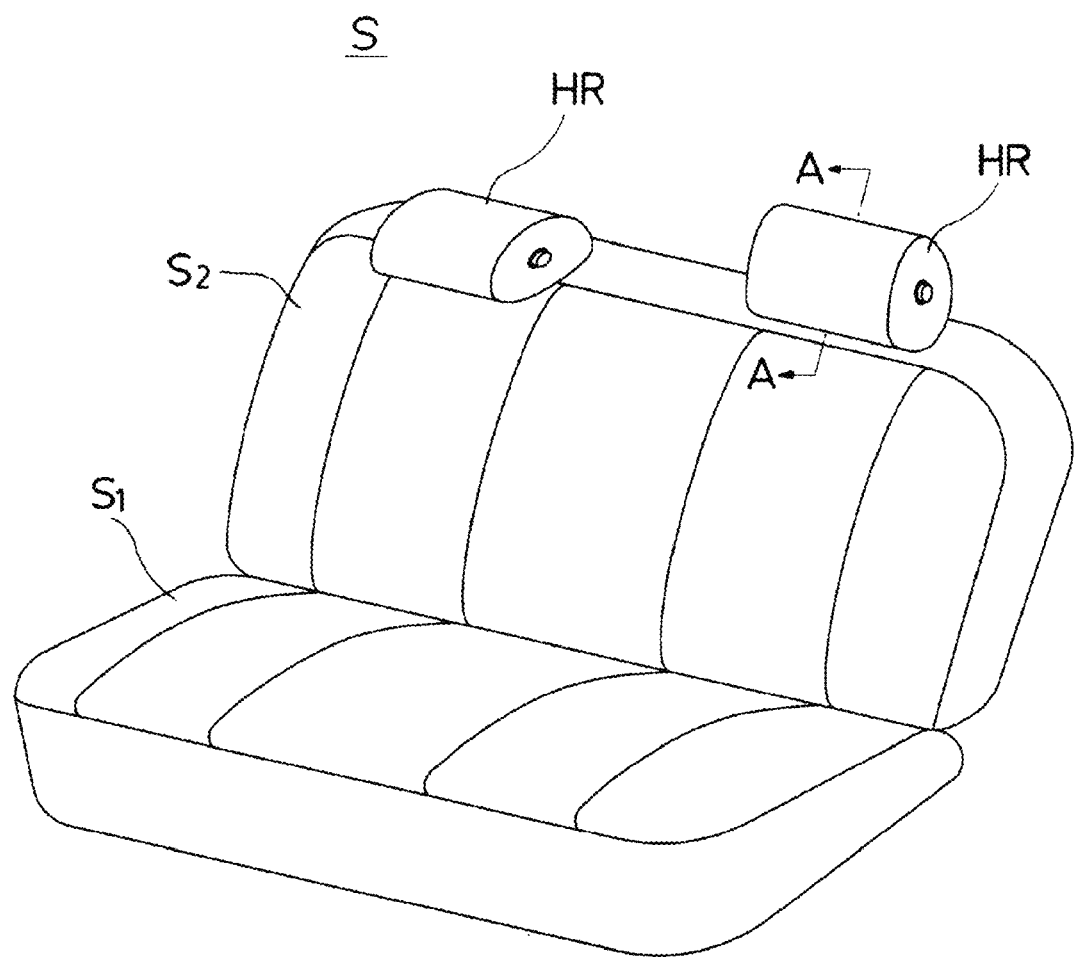
FIG. 1 is a perspective view of a seat provided with a backrest seat and a headrest.

A vehicle seat S may be, e.g., a rear seat for an automobile. As shown in FIG. 1, the vehicle seat S includes a seating seat S1 and a backrest seat S2, and a headrest HR is provided in the upper part of the backrest seat S2. The seating seat S1 and the backrest seat S2 have a publicly known configuration in which a frame, a pad, and a seat cover material for covering the frame and the pad are provided. The explanation of the details of this configuration is omitted. In this embodiment, the example of a rear seat for an automobile is shown. However, the vehicle seat S may be a front seat or an intermediate seat of vehicle if the seat is mounted with a headrest.

The headrest HR of this embodiment can be mounted on the backrest seat S2 by using a pillar 1 serving as a support member so as to be moved up and down. As a height adjusting mechanism for moving the headrest HR up and down, a publicly known mechanism can be used. Therefore, the explanation of this mechanism is omitted.

As shown in FIG. 1, the headrest HR of this embodiment can be tilted from a head support state in which the headrest HR is raised with respect to the backrest S2 to a storage state (in the example shown in FIG. 1, the left-hand side in the figure shows the storage state).

The headrest HR of this embodiment includes, as main components (illustrated in the following figures), a pillar 1 serving as a support member, a headrest frame 2 serving as a frame, and a headrest frame urging elements 3 serving as a frame urging elements, and a lock mechanism 4.

Figure 3:
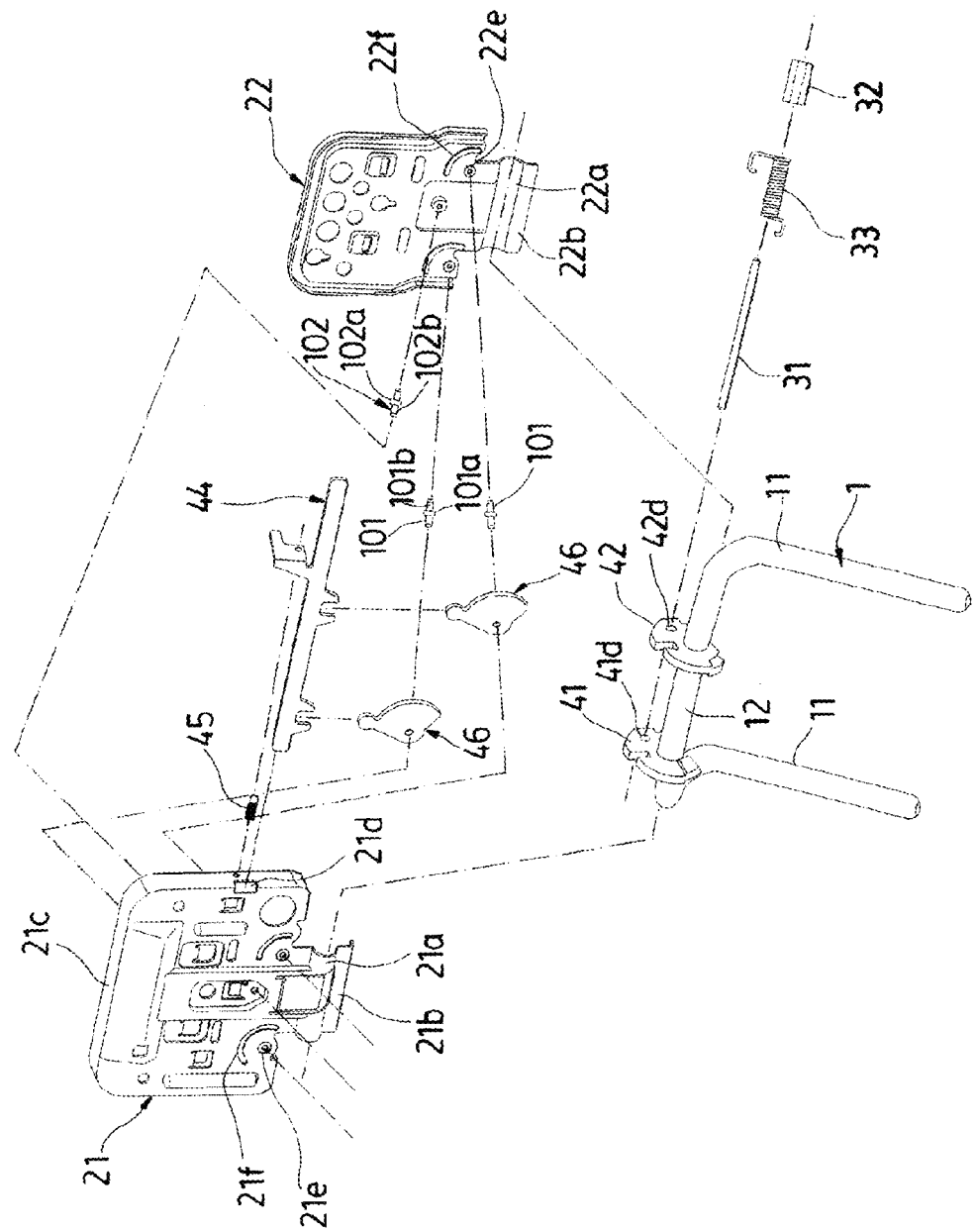
FIG. 3 is an exploded perspective view of a headrest frame and a lock mechanism.
Figure 9:
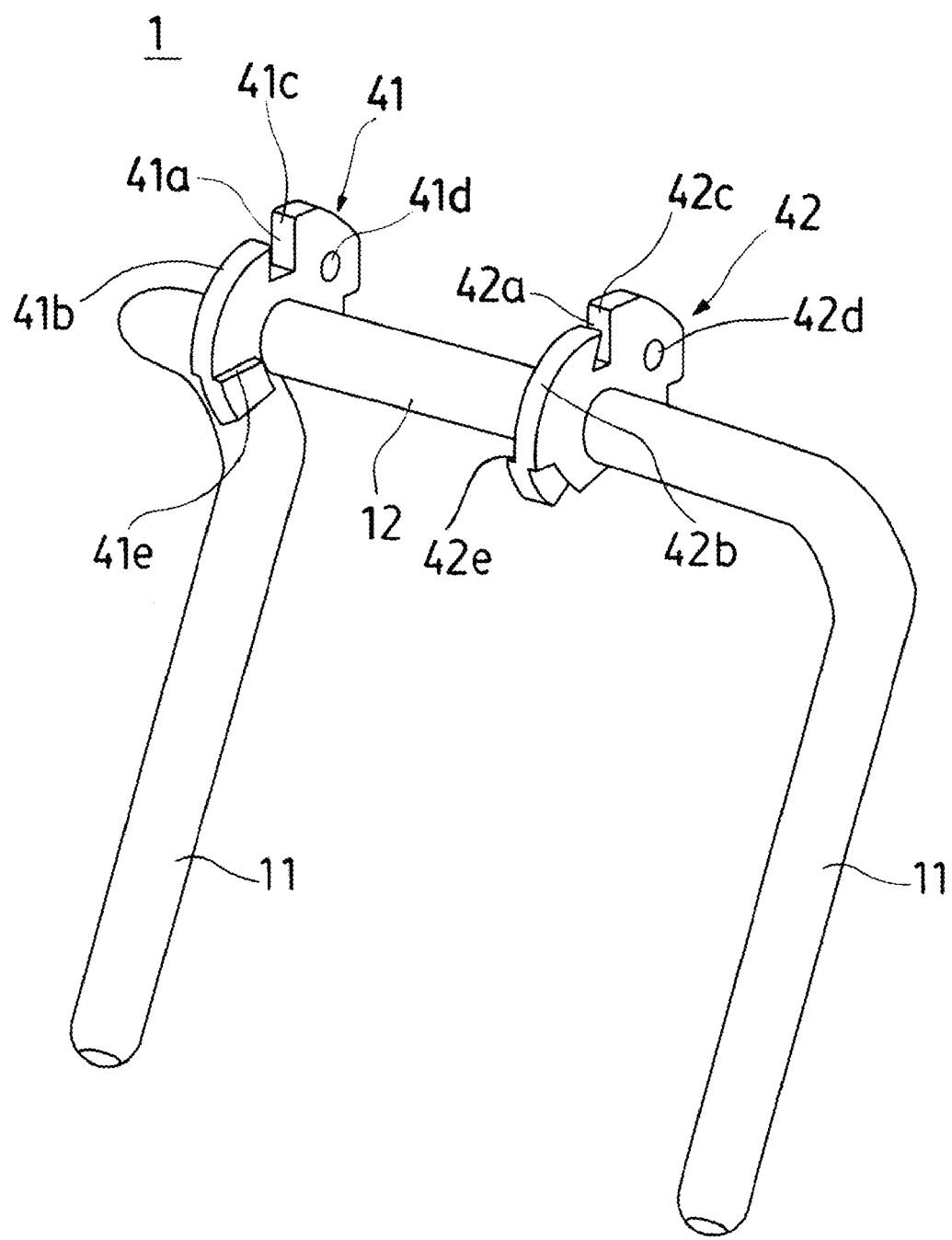
FIG. 9 is a perspective view of a pillar.

As shown in FIGS. 3 and 9, the pillar 1 serving as a support member of this embodiment has two leg parts 11, 11 mounted on the upper part of the backrest seat S2, and a transverse shaft part 12 connecting the two leg parts 11, 11 to each other. To the transverse shaft part 12 of the pillar 1, latch plates 41 and 42 serving as a locking member are fixed in the direction perpendicular to the axis of the transverse shaft part 12 by welding or the like at a predetermined interval. A portion between the latch plates 41 and 42 of the transverse shaft part 12 is rotatably held by substantially semicircular lower assembly concave parts 21a and 22a formed in the lower part of a headrest frame 2 (a main frame 21 and a sub frame 22) serving as a frame, described later.

The latch plates 41 and 42 of this embodiment constitute a part of the lock mechanism 4, described later.

Figure 6:
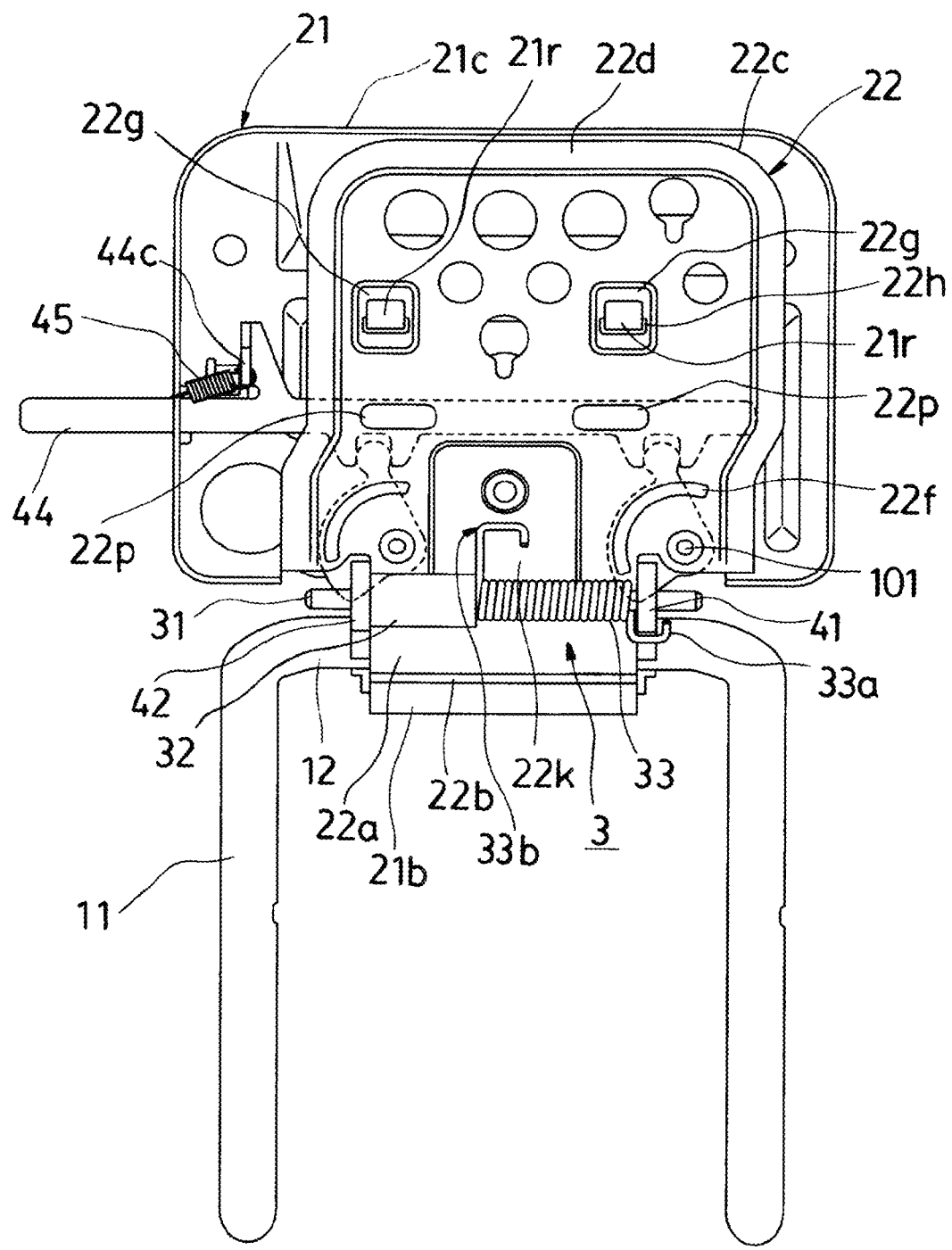
FIG. 6 is a rear view of FIG. 4.

The headrest frame 2 serving as a frame of this embodiment is rotatably engaged with the transverse shaft part 12 of the pillar 1 as described above. As shown in FIGS. 3 and 6, the headrest frame 2 is configured by combining the sub frame 22 with the main frame 21 via a plurality of hemming crimping parts 21r, 21r, blanked drawn parts 22g each having a hole 22h, and hemming crimping parts 21b and 22b, described later, so that the sub frame 22 enters into the main frame 21.

In the headrest frame 2 comprising the main frame 21 and the sub frame 22, a ratchet lever 44 serving as an operation lever and a ratchets 46 serving as a fixing member are held. The main frame 21 and the sub frame 22 are assembled integrally by crimping from both external sides with rivets 101 and 102 being held therebetween. Also, the rivet 101, 102 has a larger diameter in a central part 101a, 102a, and is formed with a caulking part 101b, 102b on both sides. The ratchet lever 44 and the ratchets 46 constitute the lock mechanism 4, described later.

Figure 4:
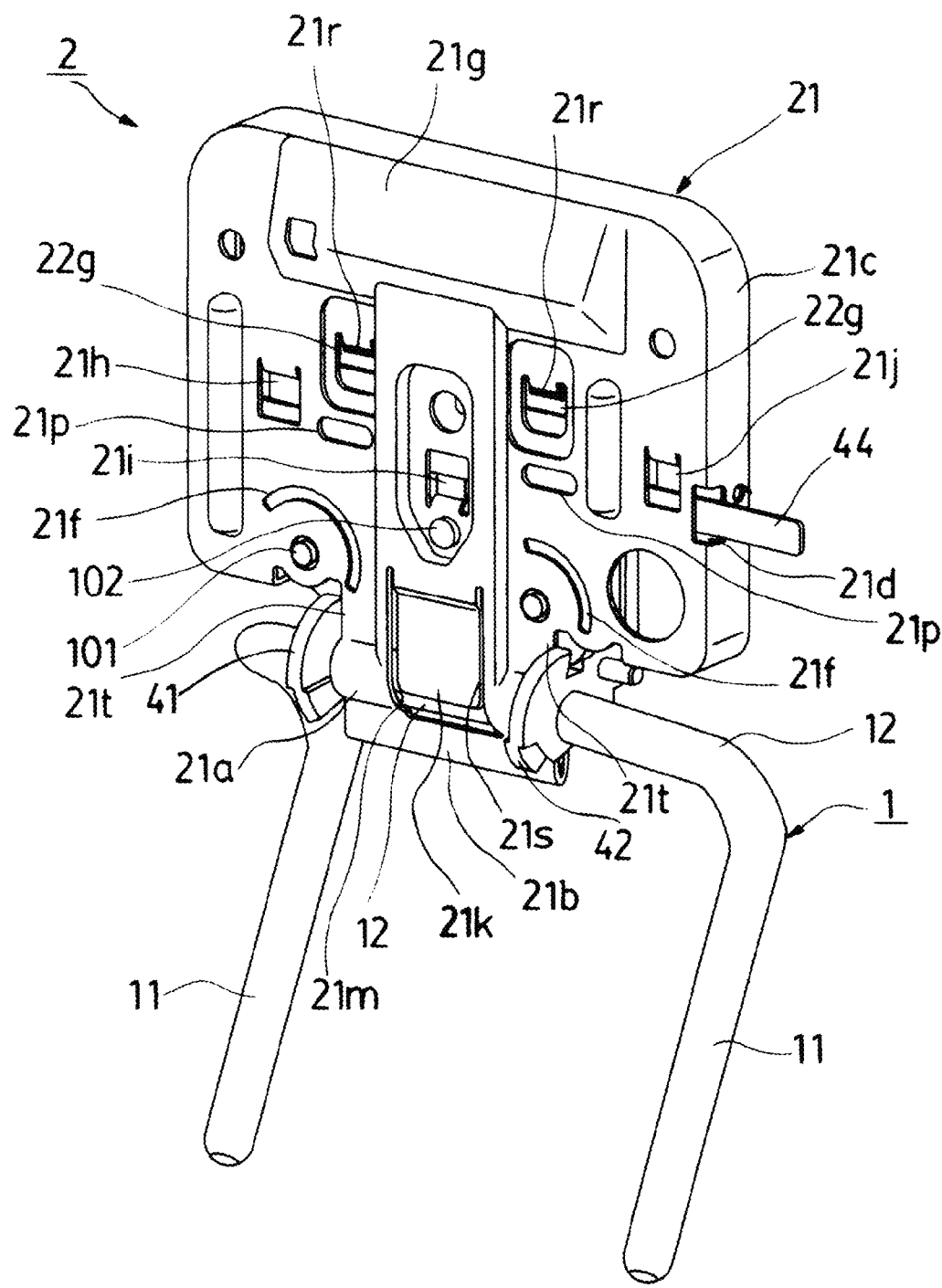
FIG. 4 is a perspective view of a headrest frame to which a pillar is assembled and a lock mechanism, viewed from the side on which these elements are in contact with the head.
Figure 5:
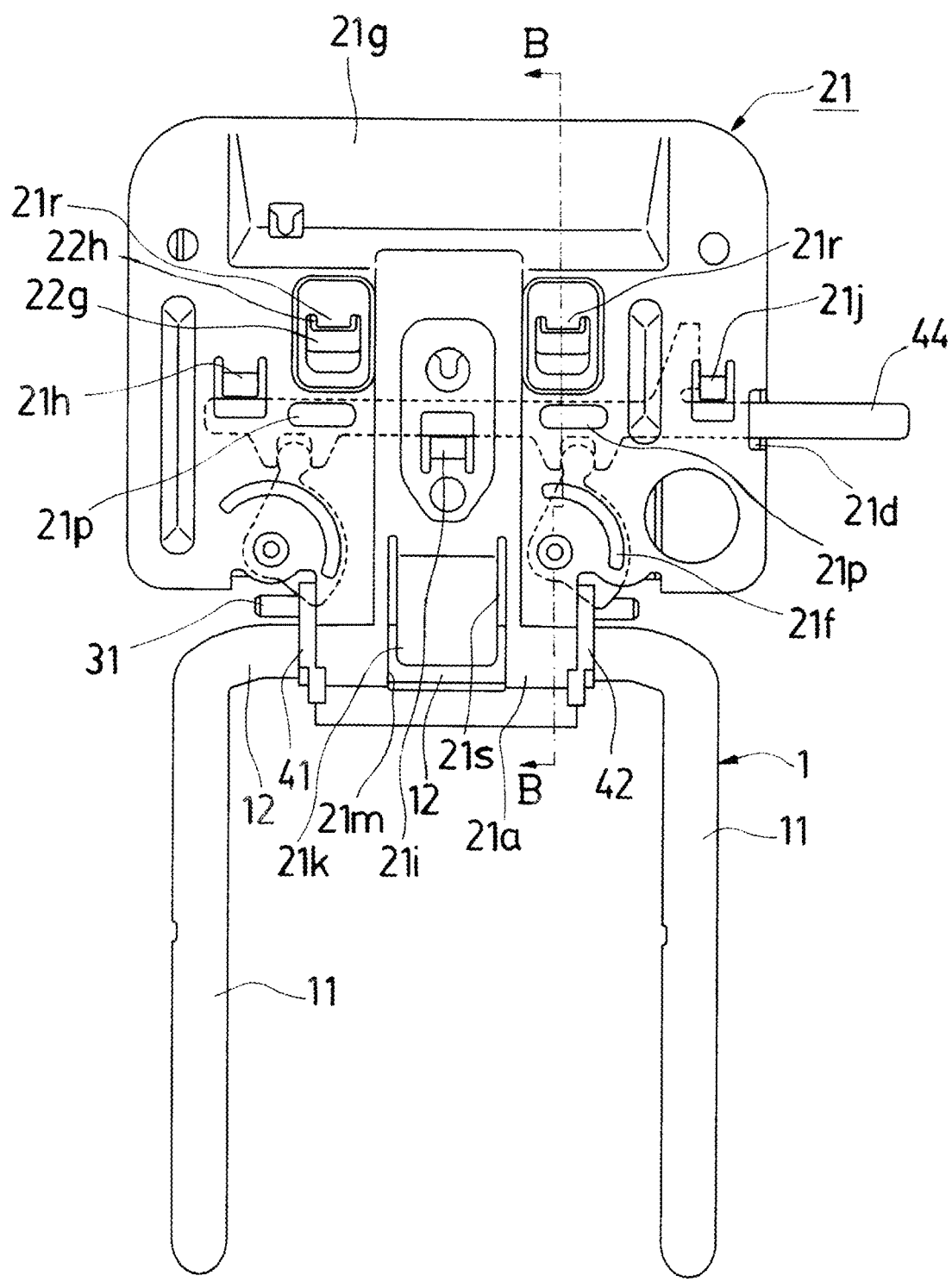
FIG. 5 is a front view of FIG. 4.

As shown in FIGS. 3 to 5, the main frame 21 of this embodiment comprises a rectangular plate body. The substantially semicircular lower assembly concave part 21a is formed in the lower part of the main frame 21, and a hemming crimping part 21b is formed continuously with the lower assembly concave part 21a. The lower assembly concave part 21a is formed with a cut-away part 21m formed by cutting an intermediate portion thereof, a play preventing piece 21k is formed so as to be directed to the cut-away part 21m, and the play preventing piece 21k is formed with a slit 21s on both sides thereof. The play preventing piece 21k has a spring effect due to the slits 21s, and makes contact with the transverse shaft part 12 of the pillar 1 so as to push it. Thereby, a play between the headrest frame 2 and the pillar 1 can be prevented more reliably.

Also, a jutting-out part 21g is formed on the upper side of the main frame 21. This jutting-out part 21g comes into contact with the jutting-out part of a resin-made front cover member 7a, described later, and also secures the strength.

Also, at the outer periphery of the main frame 21, a folded wall part 21c is formed excluding a predetermined range on both sides of the lower assembly concave part 21a.

On the inside of the main frame 21, boss parts 21e are formed so as to project toward the inside in portions through which the rivet 101 serving as a rotation shaft for the ratchet 46 is inserted. Also, on the outer periphery side of each of the boss parts 21e, a substantially bow-shaped protruding part 21f projecting toward the rotating surface of the ratchet 46 is formed. This substantially bow-shaped protruding part 21f guides the ratchet 46 so as to be movable without a play by holding the ratchet 46 together with a substantially bow-shaped protruding part 22f formed on the sub frame 22, described later.

On one side surface of the folded wall part 21c, a cut-away part 21d is formed. The ratchet lever 44 is inserted through this cut-away part 21d. Also, on the extension of the cut-away part 21d, three tongue pieces 21h, 21i and 21j bent toward the inside are formed so as to serve as a guide when the ratchet lever 44 is inserted.

Among these three tongue pieces 21h, 21i and 21j, the two tongue pieces 21h and 21j are formed spacedly in the right-and-left direction by being bent to the inside from the upside to the downside. In a substantially central portion between the tongue pieces 21h and 21j arranged in the right-and-left direction, one tongue piece 21i bent to the inside from the lower side to the upper side is formed. The ratchet lever 44 is inserted with the end parts of the three tongue pieces 21h, 21i and 21j being used as guides. The ratchet lever 44 of this embodiment constitutes a part of the lock mechanism 4, described later.

Furthermore, embossed parts 21p, 21p directed to the ratchet lever 44 side are formed at the ratchet lever 44 position of the main frame 21 in the state in which the ratchet lever 44 is inserted. The embossed part 21p guides the ratchet lever 44 so as to be movable without a play by holding the ratchet lever 44 together with an embossed part 22p of the sub frame 22, described later.

Figure 7:
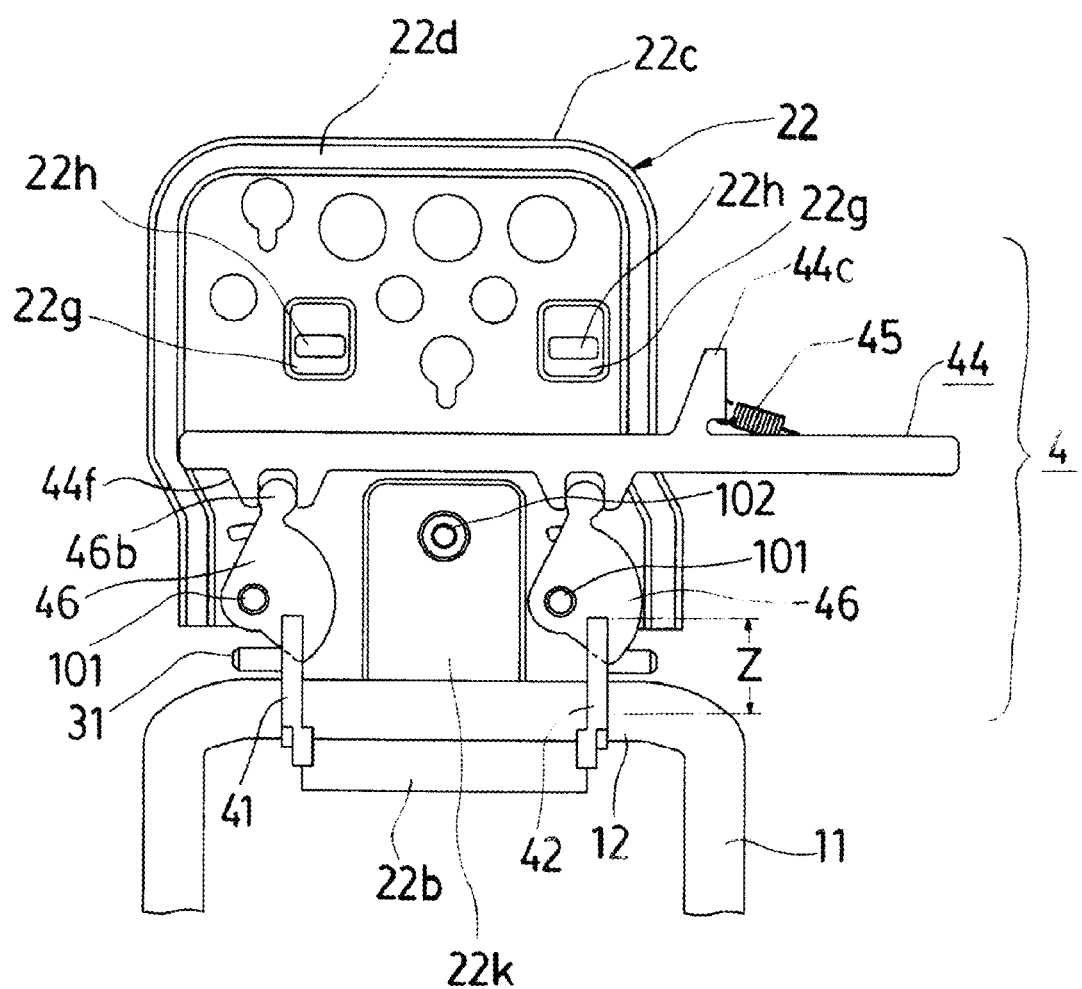
FIG. 7 is an explanatory view of a lock mechanism.
Figure 8:
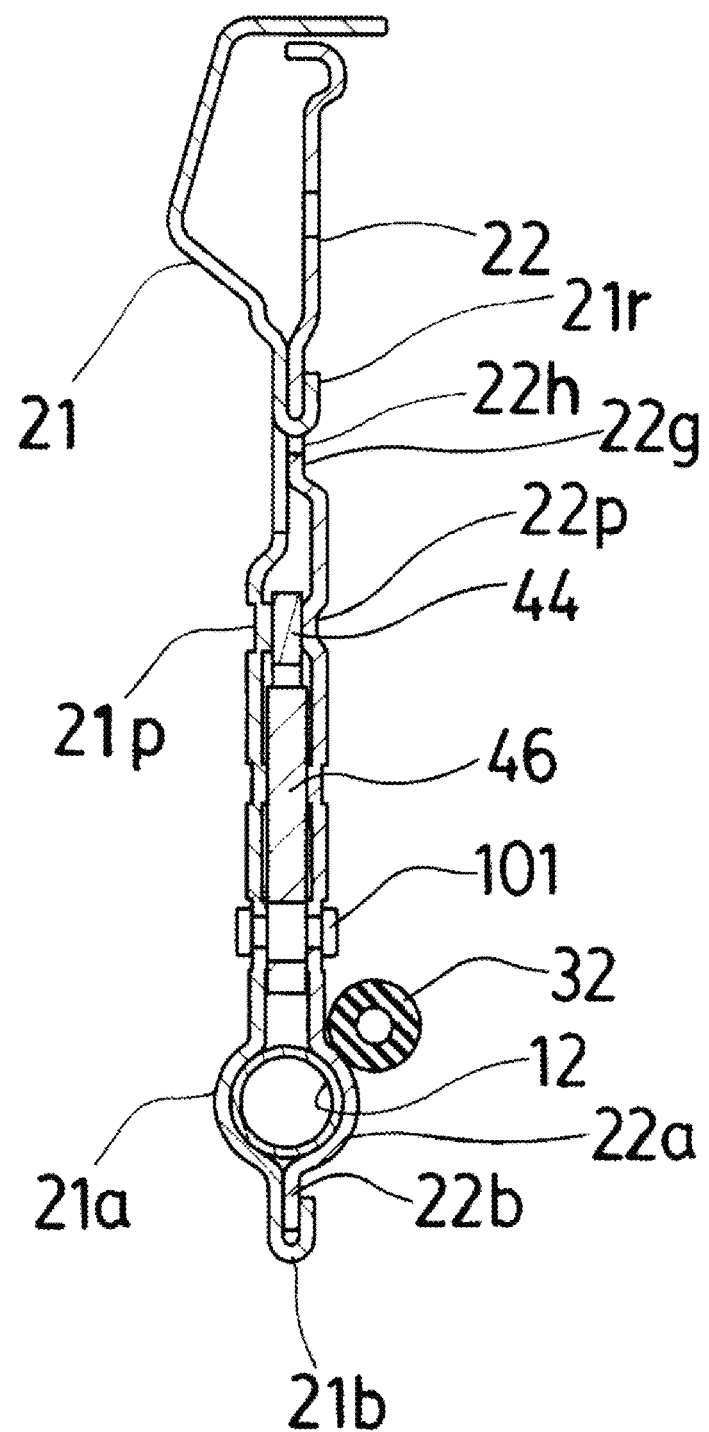
FIG. 8 is a sectional view taken along the line B-B of FIG. 5.

As shown in FIGS. 3, 6 and 7, the sub frame 22 of this embodiment comprises a rectangular plate body, and is configured in a shape such that the upper part thereof extending from a predetermined portion, in this embodiment, a position at which the ratchet lever 44 is disposed, is offset to one side (the side distant from the cut-away part 21d).

Also, as shown in FIGS. 6 and 7, the sub frame 22 is formed with a folded wall part 22c in the upper part and at the right and left excluding the lower side. The inside of the folded wall part 22c is formed as an expanding part 22d expanding from a general surface, and this expanding part 22d and a urge receiving part 22k, described later, lower the general surface (the surface on the upper side in FIG. 6). Thereby, the configuration is made such that the rivets 101 and 102 and the hemming crimping parts 21r, 21r are located at positions lower than the expanding part 22d and the urge receiving part 22k, so that interference with other members is prevented.

As shown in FIG. 7, at positions separating a predetermined distance from the centerline of the sub frame 22, blanked drawn parts 22g raised to the opposed main frame 21 side and each having a hole 22h for hemming crimping are formed.

In the lower part of the sub frame 22, a substantially semicircular lower assembly concave part 22a is formed, and a hemming crimping part 22b is formed continuously with the lower assembly concave part 22a.

As described above, the main frame 21 and the sub frame 22 are crimped in the same direction from the main frame 21 side to the sub frame 22 side by the hemming crimping parts 21r, 21r, the blanked drawn parts 22g each having the hole 22h, and the hemming crimping parts 21b and 22b. Therefore, the fabrication is easy to do as compared with the case of burring. The configuration is made such that a crimping claw or the like is not exposed to the main frame 21 side, and a protrusion or the like is not produced as far as possible on the headrest frame 2 side, the side making contact with the head.

Also, on the opposite side to the hemming crimping part 22b, the urge receiving part 22k is formed by drawing continuously with the lower assembly concave part 22a. As shown in FIG. 6, the urge receiving part 22k, which makes contact with an end 33b of a spring 33, is formed so as to rise on the spring disposition side. Also, the urge receiving part 22k makes contact with the spring 33 constituting the headrest frame urging elements 3, and also makes contact with a damper 32, described later, at the time of rotating. Therefore, a play is prevented, and also noise is prevented.

The folded wall part 22c (refer to FIG. 7) folded to the inside is formed excluding the substantially semicircular lower assembly concave part 22a side, that is, on the upper side and on the right and left sides.

On the sub frame 22, boss parts 22e are formed so as to project toward the inside at positions aligning with the boss parts 21e of the main frame 21, that is, in portions in which the rivet 101 serving as a rotation shaft for the ratchet 46 is inserted through. Also, at the ratchet lever 44 position of the sub frame 22, the embossed parts 22p, 22p directed to the ratchet lever 44 side are formed.

Also, on the inside of the sub frame 22, the substantially bow-shaped protruding parts 22f projecting toward the rotating surface of the ratchet 46 are formed so as to align with the substantially bow-shaped protruding parts 21f formed on the main frame 21.

As shown in FIGS. 3 and 6, the headrest frame urging elements 3 serving as a frame urging elements, which is used to urge the headrest frame 2 to one side (that is, the tilt side), is made up of a shaft 31, the damper 32, the spring 33, shaft insertion holes 41d and 42d formed in the latch plates 41 and 42 constituting the lock mechanism 4, and the aforementioned urge receiving part 22k.

The shaft 31 is a round bar, and the damper 32 is formed by a hollow cylindrical body made of rubber. Also, the spring 33 is disposed so that one end 33a thereof is locked to the latch plate 41 and the other end 33b side is in contact with the damper 32, and is brought into contact with the aforementioned urge receiving part 22k with the other end 33b thereof being used as a wide pressing part. By the urging, at the normal time, the headrest frame 2 is subjected to an urging force in the tilt direction.

Assembling is performed by inserting the shaft 31 through the two latch plates 41 and 42. At this time, the shaft 31 is inserted through the shaft insertion hole 41d (or 42d) in one latch plate 41 (or 42), and then the damper 32 and the spring 33 are put on the shaft 31. Thereafter, the shaft 31 is inserted through the shaft insertion hole 42d (or 41d) in the other latch plate 42 (or 41).

The symbol 4 shown in FIG. 7 denotes the lock mechanism, which is provided between the pillar 1 and the headrest frame 2.

The lock mechanism 4 of this embodiment includes, as main components, the latch plates 41 and 42 serving as a locking member, the ratchet lever 44 serving as an operation lever, the ratchets 46 serving as a fixing member, and a spring 45 serving as a ratchet lever urging elements (operation lever urging elements).

The latch plates 41 and 42 are fixed to the transverse shaft part 12 of the pillar 1 in the direction perpendicular to the axis of the transverse shaft part 12 by welding or the like at a predetermined interval as described above.

On the upper sides of the latch plates 41 and 42, as shown in FIG. 9, engagement groove parts 41a and 42a are formed along the transverse shaft part 12.

The latch plate 41, 42 is formed with an arcuate outer periphery part (outer peripheral surface) 41b, 42b, the engagement groove part 41a, 42a, and a stopper part 41c, 42c formed by a wall of a portion beyond the engagement groove part 41a, 42a, with which wall the ratchet comes into contact before entering into the engagement groove part. The stopper part 41c, 42c is formed so as to be higher than the arcuate outer periphery part (outer peripheral surface) 41b, 42b by a distance A, B shown in FIGS. 10 to 12.

In the normal case, the ratchet 46 enters into and engages with the engagement groove part 41a, 42a of the latch plate 41, 42 after coming into contact with the stopper part 41c, 42c. Thereby, the ratchet 46 can be guided so as to engage with the engagement groove part 41a, 42a of the latch plate 41, 42 from the height direction. In the case where the ratchet 46 moves slowly on the arcuate outer periphery part (outer peripheral surface) 41b, 42b, the ratchet 46 sometimes enters into the engagement groove part 41a, 42a without making contact with the stopper part 41c, 42c.

Figure 10:
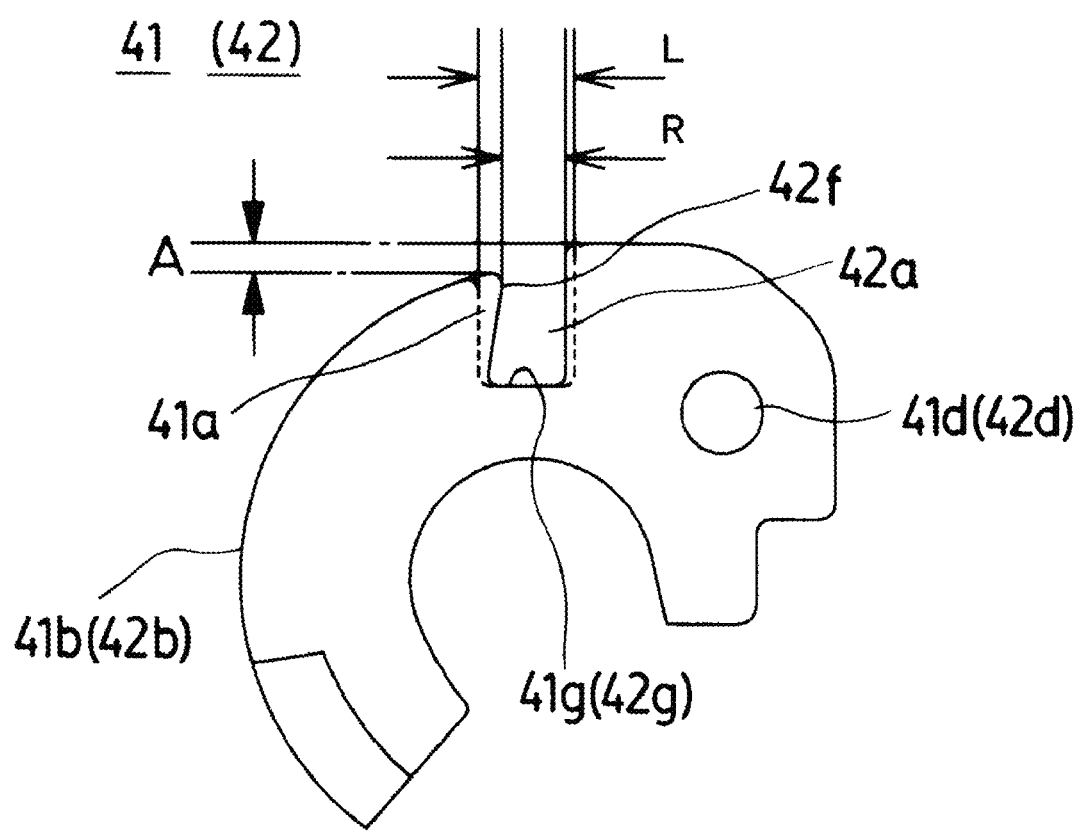
FIG. 10 is an explanatory view of a latch plate side surface.

In this embodiment, as shown in FIG. 10, the engagement groove parts 41a and 42a are formed so that the width (L) of the engagement groove part 41a is wider than the width R of the engagement groove part 42a. By changing the width of the engagement groove part 41a, 42a in this manner, the ratchet 46 is allowed to enter easily into the engagement groove part 41a of the latch plate 41 by the engagement groove part 41a having a wider width of the latch plate 41, and a play between the ratchet 46 and the latch plate 41, 42 can be decreased by the engagement groove part 42a having a narrower width of the latch plate 42.

Also, the latch plates 41 and 42 are formed so that the shapes of the engagement groove parts 41a and 42a are different in addition to the difference in width between the engagement groove parts 41a and 42a. The engagement groove part 42a of the latch plate 42 provided on the right-hand side in FIG. 9 is formed so that the width of the upper end side is narrower, and the engagement groove part 41a of the latch plate 41 provided on the left-hand side in FIG. 9 is formed so as to have a shape such that the groove width is unchanged in the up-and-down direction.

Also, as shown in FIG. 9, on the surface sides on which the lower sides (at the time when being mounted on the pillar) of latch plates 41 and 42 face to each other, stoppers 41e and 42e each consisting of a pushing-out part jutting out to the facing side are formed. When the headrest HR is tilted and stored, the stopper part 41e, 42e abuts on and supports a side part 21t, 21t on the lower part side of the main frame 21, by which the rotation can be regulated. By providing the stopper part 41e, 42e in this manner, the tilt angle can be set by setting the formation position of the stopper part 41e, 42e as predetermined. Also, besides the latch plate 41, 42 and the ratchet 46, the stopper part 41e, 42e of the latch plate 41, 42 can abut on and support the side part 21t, 21t on the lower part side of the main frame 21. Therefore, even when the ratchet 46 is released from the latch plate 41, 42, the holding strength at the storage time can be secured. In the example shown in FIG. 9, the stopper parts 41e and 42e are provided so as to face to each other. However, only either one of the stopper parts 41e and 42e may be provided. Also, in this example, the stopper part 41e, 42e is the pushing-out part jutting out to the inside. However, the stopper part 41e, 42e may be formed so as to jut out to the outside so that the main frame 21 is caused to abut on the stopper part jutting out to the outside by appropriately changing the lower part side of the main frame 21.

Figure 11:
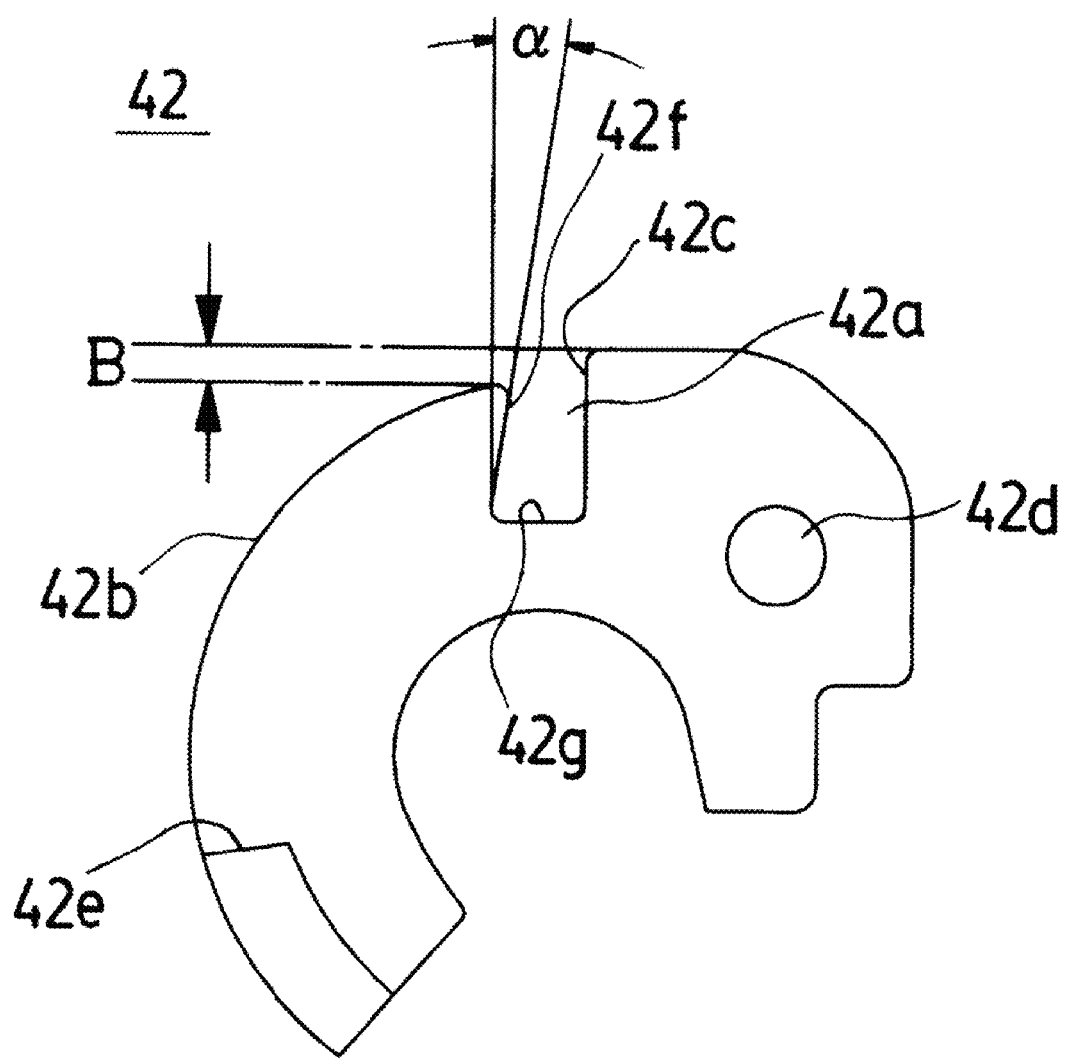
FIG. 11 is a side view of a latch plate.

FIG. 11 is a side view of the latch plate 42. The upper side of the engagement groove part 42a of the latch plate 42 tilts to the inside (angle α in FIG. 11) with a portion somewhat wider than the thickness of the ratchet 46 being left. Thus, in this embodiment, the engagement groove part 42a of at least one latch plate (in this embodiment, the latch plate 42) is formed so that the upper end side is narrower. Therefore, the contact points of the latch plate 42 and the ratchet 46 in the raised state are an upper end side 42f of the engagement groove part 42a of the latch plate 42 and a lock engagement point 46c of the ratchet 46 shown in FIG. 15. The lock engagement point 46c, which is the contact point, is a side surface position at the time when the ratchet 46 comes into contact with a groove bottom 42g of the engagement groove part 42a of the latch plate 42.

That is to say, the groove bottom 42g is formed so as to be positioned above the end part of the ratchet 46. Since the rotation of the ratchet 46 is inhibited at the position of the groove bottom (bottom part) 42g, when the ratchet 46 engages with the engagement groove part 41a, 42a, the end part of the ratchet 46 comes into contact with the groove bottom (bottom part) 42g of the engagement groove part 41a, 42a of the latch plate 41, 42, and therefore the groove bottom 42g plays a role as a rotation stopper for the ratchet 46.

Figure 15:
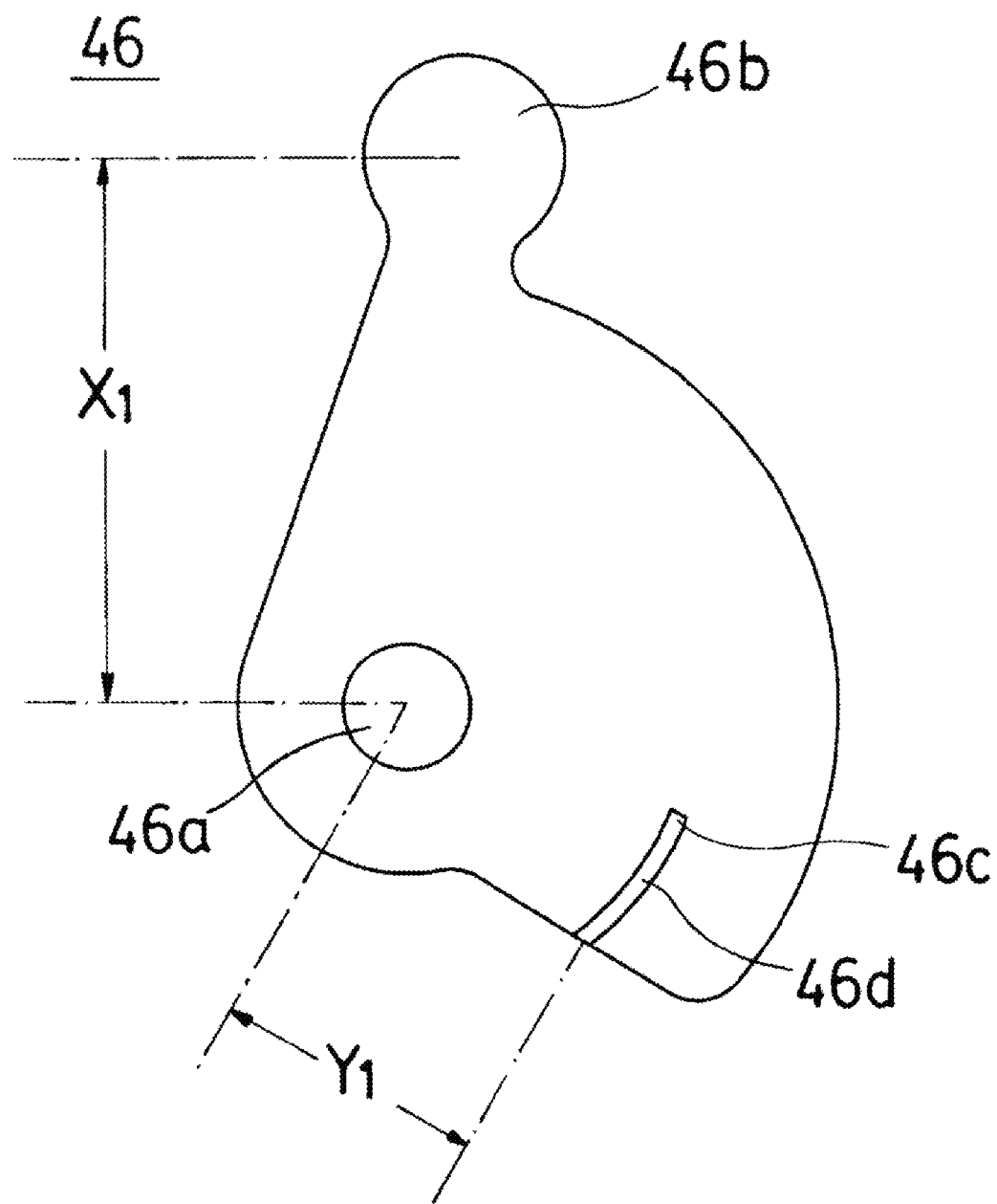
FIG. 15 is a plan view of a ratchet.

The symbol 46d shown in FIG. 15 denotes a locus formed by moving the ratchet 46 from a disengagement position at which the ratchet 46 comes off the engagement groove part 42a to a position at which the ratchet 46 comes into contact with the groove bottom 42g of the engagement groove part 42a of the latch plate 42.

That is to say, as shown in FIG. 7, the configuration is made such that the distance Z from the transverse shaft part 12 of the pillar 1 to a portion in which the upper end side of the latch plate 42, which is formed so as to be narrower, comes into contact with the ratchet 46 is large as compared with any other portion positioned in the engagement groove part 42a of the ratchet 46. Therefore, the contact point separates from the axis of the transverse shaft part 12 of the pillar 1 (the rotation center of the headrest frame 2), so that when the ratchet 46 moves from the engagement position to the disengagement position (when the lock is released), a releasing load placed by the urging force of the headrest frame urging elements 3 (the spring 33) from the rear can be decreased, and the adjustment of releasing load can be made. In the case of this embodiment, since the engagement groove part 42a of the latch plate 42 located on the side engaging with an operation knob of the ratchet lever 44 is formed so as to be narrow, a force from the ratchet lever 44 can be transmitted reliably.

Also, the latch plate 41, 42 is provided with the shaft insertion hole 41d, 42d for inserting the shaft 31 constituting the headrest frame urging elements 3. Thereby, the headrest frame urging elements 3 can be urged from the outside of the headrest frame 2, and also a compact urging elements formed so as to be in close contact with the frame can be configured.

Figure 12:
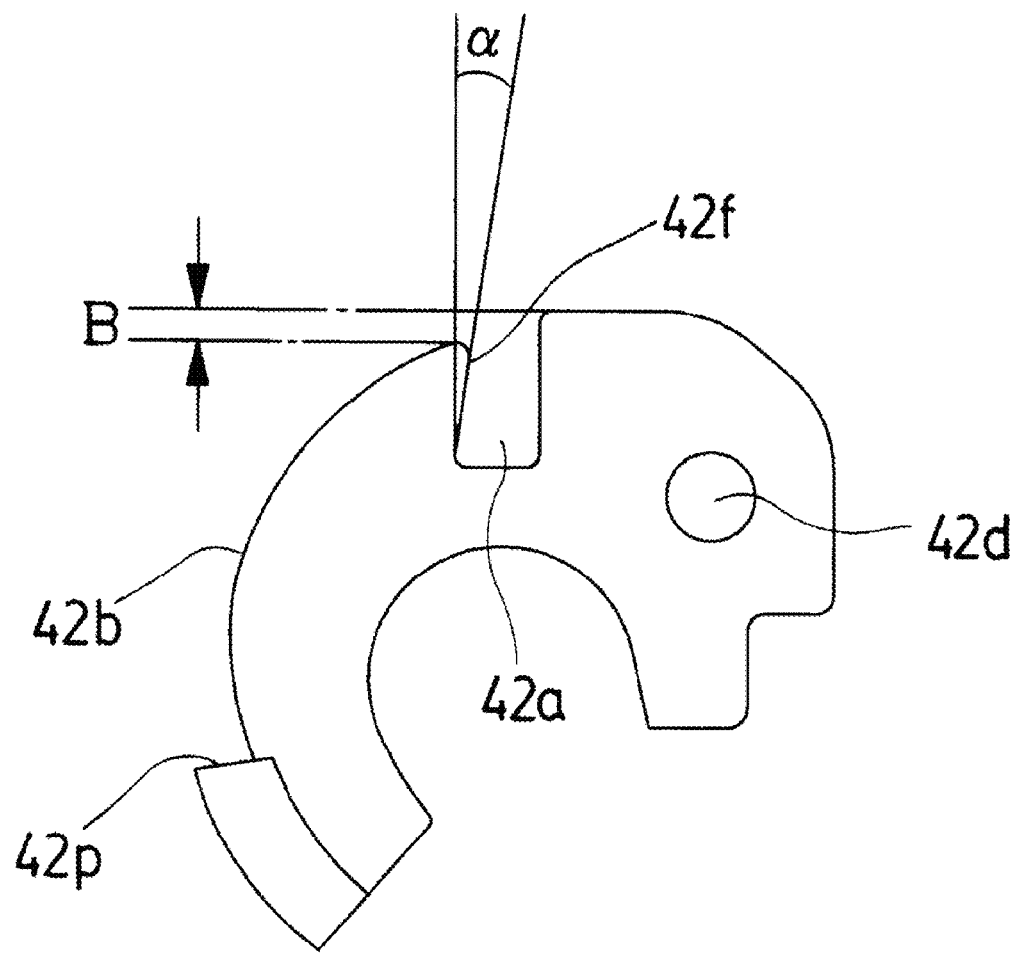
FIG. 12 is a side view showing another example of a latch plate.
Figure 13:
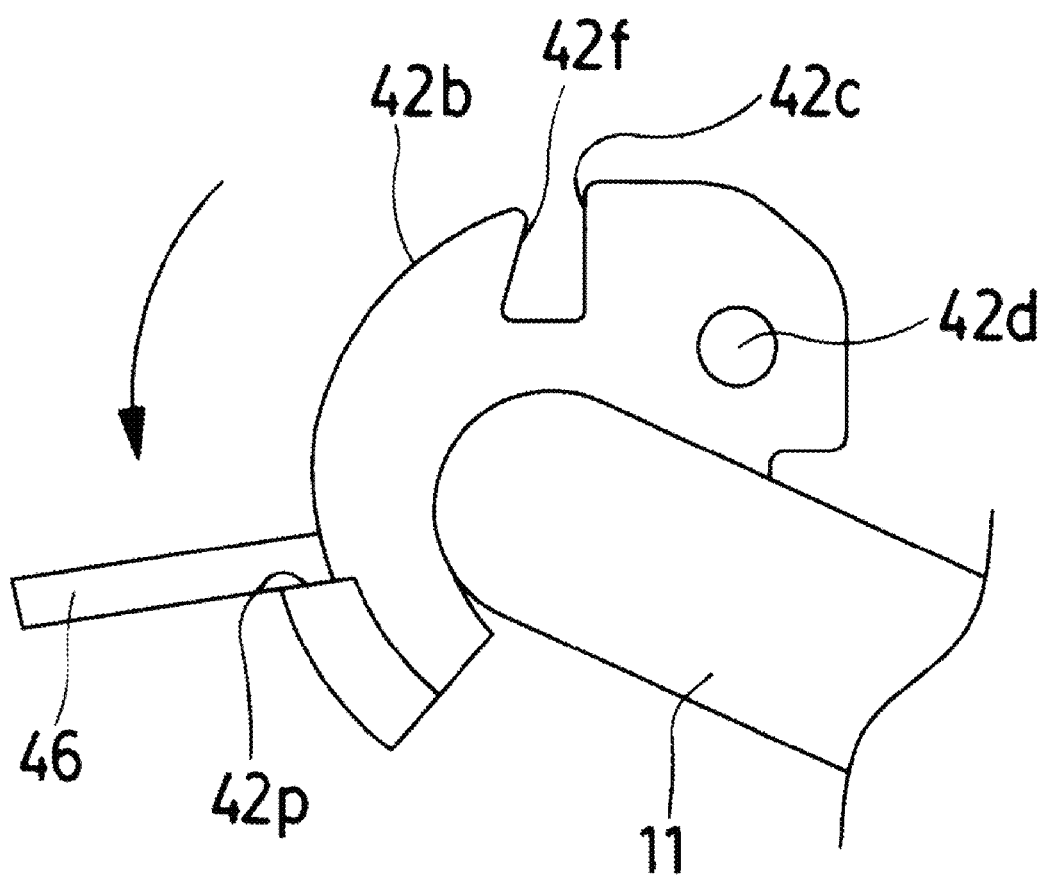
FIG. 13 is an explanatory view of the operation of the latch plate shown in FIG. 12.

Furthermore, as shown in FIG. 12, stopper parts 41p and 42p (only a stopper part 42p is shown in FIG. 12) each consisting of a level difference part may be formed in the outer periphery parts 41b and 42b of the latch plates 41 and 42. In this case, as indicated by the arrow mark in FIG. 13, when the headrest HR is stored, the ratchet 46 comes into contact with the stopper part 41p, 42p, so that the further rotating of the ratchet 46 is inhibited. Since the rotation can be inhibited by the ratchet 46 and the latch plate 41, 42, and is not inhibited by the main frame 21, the thickness of the main frame 21 can be decreased.

Figure 14:
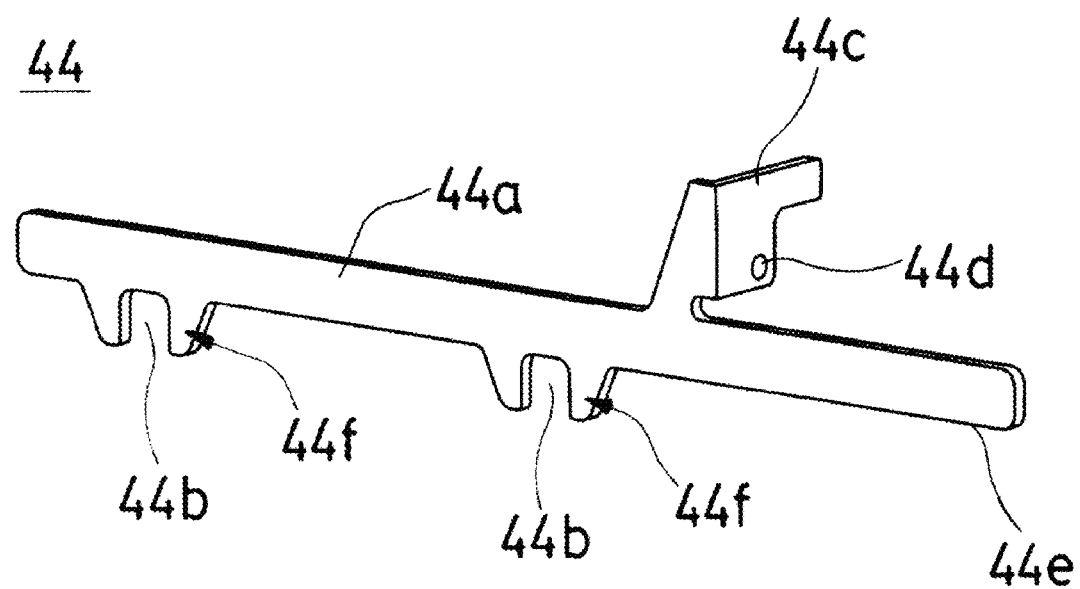
FIG. 14 is a perspective view of a ratchet lever.

As shown in FIG. 14, the ratchet lever 44 of this embodiment is formed by a slender plate body, and has a plate main body 44a sliding in the transverse direction. The plate main body 44a is formed with engagement concave parts 44b, 44b directed to the pillar 1 side. On the opposite side to the engagement concave parts 44b, 44b, a movement locking part 44c is formed so as to extend from the plate main body 44a in the substantially perpendicular direction, and the movement locking part 44c is formed with a locking part 44d for the ratchet lever urging elements 45.

The engagement concave parts 44b, 44b are formed between jutting-out parts 44f, 44f jutting out from the plate main body 44a to the pillar 1 side so as to hold circular one end side of the ratchet 46 and to allow the ratchet 46 to rotate.

To the ratchet lever 44, one end of the ratchet lever urging elements (spring) 45 is connected so that the ratchet 46 is urged in the engagement groove part 41a, 42a direction of the latch plate 41, 42. The symbol 44e denotes end part side engaging with the operation knob.

As shown in FIGS. 3, 7 and 15, the ratchet 46 of this embodiment has a rotation hole 46a serving as a rotation axis, an engagement part 46b, and the lock engagement point 46c, and is pivotally supported on the headrest frame 2 with the rivet 101 disposed between the main frame 21 and the sub frame 22 being used as a rotation shaft.

Also, on the inside (the opposed side) of the main frame 21 and the sub frame 22, the substantially bow-shaped protruding parts 21f and the substantially bow-shaped protruding parts 22f are formed so as to project toward the rotating surface of the ratchet 46 to guide the rotation of the ratchet 46.

The engagement part 46b on one end side of the ratchet 46 engages with the engagement concave part 44b, 44b on the ratchet lever 44, and the lock engagement point 46c on the other end side engages with the engagement groove part 41a, 42a of the latch plate 41, 42, by which the raised state of the headrest HR is kept.

The engagement part 46b on one end side of the ratchet 46 engages with the engagement concave part 44b, 44b of the ratchet lever 44, and the surface touching the engagement concave part 44b, 44b is formed into a circular shape, preferably a complete round shape. Thereby, the ratchet 46 can be rotated following the movement of the ratchet lever 44 stably. The ratchet 46 has a thickness larger than that of the ratchet lever 44. Therefore, the ratchet 46 can be prevented from coming off the ratchet lever 44.

Also, as shown in FIG. 15, the ratchet 46 is formed so that the distance X1 between the center of the rotation hole 46a of the ratchet 46 and the center of the engagement part 46b on one end side of the ratchet 46 engaging with the engagement concave part 44b of the ratchet lever 44 is longer than the distance Y1 between the center of the rotation hole 46a of the ratchet 46 and the position of the lock engagement point 46c on the other end side of the ratchet 46 engaging crossingly with the engagement groove part 42a of the latch plate 42 (in the case of FIG. 15, the engagement locus 46d). Thereby, the releasing load at the time when the lock of the ratchet 46 to the latch plate 41, 42 is released can be decreased.

That is to say, in this embodiment, in the raised state, the ratchet 46 pivotally supported on the headrest frame 2 is urged in the tilt direction by the spring 33, so that friction is generated in a portion in which the ratchet 46 comes into contact with the engagement groove part 42a of the latch plate 42. Therefore, when the ratchet 46 is rotated from the engagement position at which the ratchet 46 is positioned in the engagement groove part 42a of the latch plate 42 to the disengagement position at which the ratchet 46 comes off the engagement groove part 42a, frictional resistance is exerted, so that a difficult-to-rotate state is formed.

However, the ratchet 46 of this embodiment is formed so that the distance X1 between the center (supporting point) of the rotation hole 46a and the center (power point) of the engagement part 46b to which a load is applied by the ratchet lever 44 is longer than the distance Y1 between the center (supporting point) of the rotation hole 46a and the position (point of application) of the lock engagement point 46c engaging crossingly with the engagement groove part 42a of the latch plate 42. Therefore, the ratchet 46 can be moved from the engagement position to the disengagement position with less force. That is to say, a so-called link ratio can be set, and thereby the releasing load can be adjusted.

Also, the ratchet lever 44 is configured so as to hold circular one end side of the ratchet 46 and to allow the ratchet 46 to rotate. Therefore, the engagement part 46b on one end side of the ratchet 46 is held by and engages constantly with the engagement concave part 44b of the ratchet lever 44, so that the ratchet 46 can be prevented from turning by one. That is to say, the ratchet 46 turns smoothly following the movement of the ratchet lever 44 always, malfunction is prevented, and the switching-over by the lock mechanism 4 can be performed reliably.

The ratchet 46 of this embodiment can turn in the range of rotation angle of 20 to 40 degrees around the rotation hole (rotation axis) 46a.

If the ratchet 46 is configured so as to rotate in the range of rotation angle of 20 to 40 degrees around the rotation hole (rotation axis) 46a thereof, the displacement in the transverse direction of the ratchet lever 44 for the disengagement caused by the turning of the ratchet 46 from the engagement position to the disengagement position and the turning of the ratchet 46 can be adjusted so as to be optimum. Thus, the displacement relating to the operation caused by the lock mechanism 4 can be adjusted.

Figure 16:
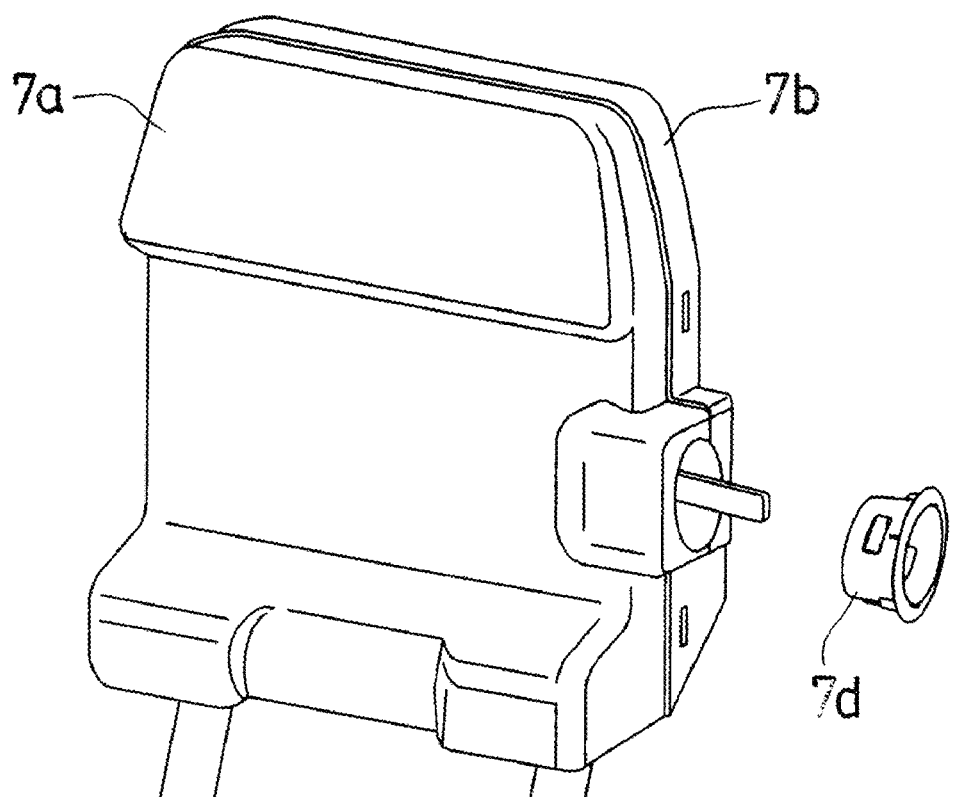
FIG. 16 is a partially exploded perspective view of a cover.

FIG. 16 shows an assembled state of a cover material 7. After the pillar 1 serving as a support member, the headrest frame 2 serving as a frame, the headrest frame urging elements 3 serving as a frame urging elements, the lock mechanism 4, and the like have been assembled, these elements are covered with the cover material 7. The cover material 7 comprises a front cover member 7a, a rear cover member 7b, and a seat cover fastening cover member 7c, which are made of a resin, and a garnish 7d for preventing the operation knob of operation section and the like from coming off.

Figure 2:
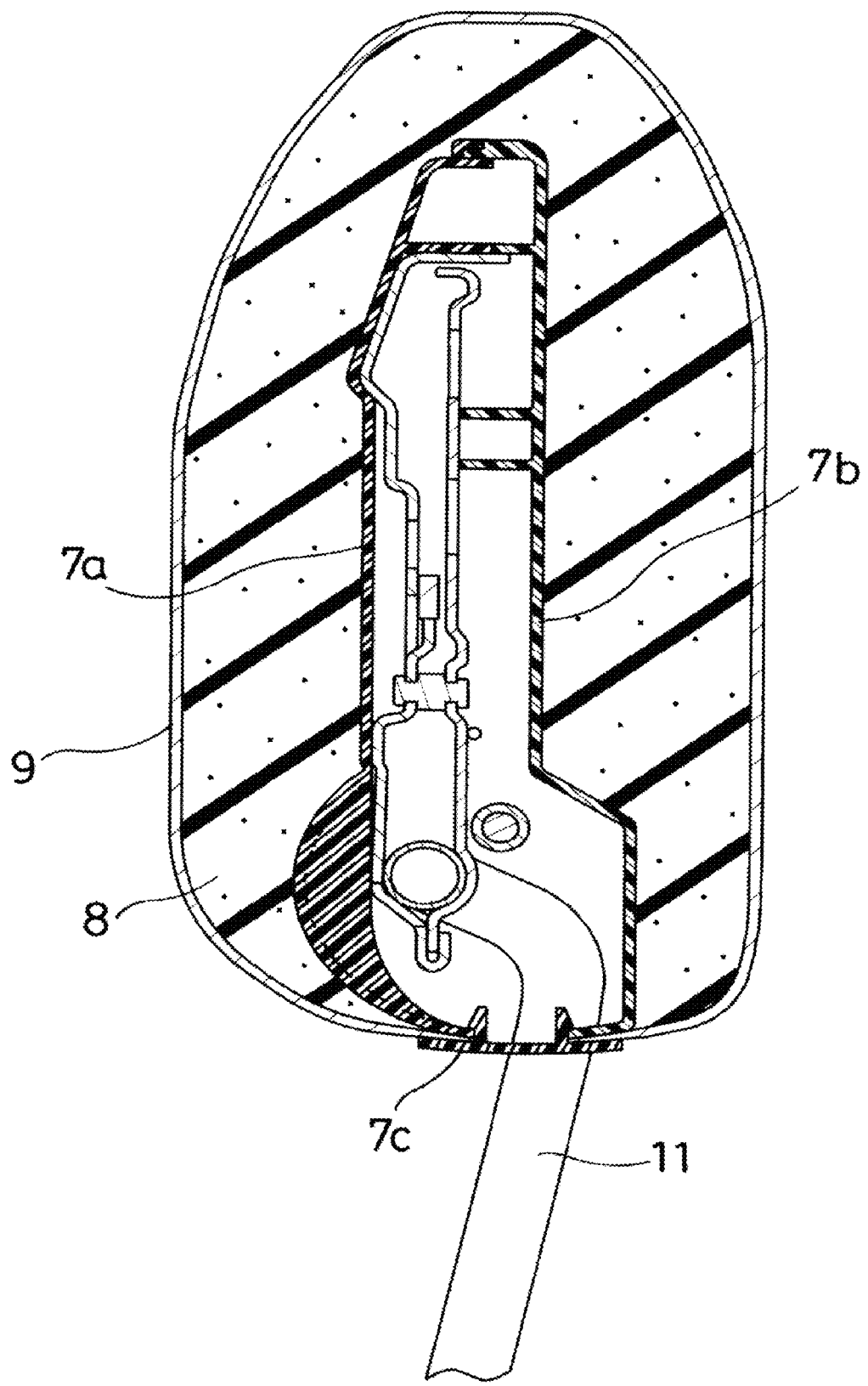
FIG. 2 is a sectional view taken along the line A-A of FIG. 1.

As shown in FIG. 2, a pad material 8 is disposed at the outer periphery of the cover material 7, and a seat cover material 9 covers the pad material 8.

The seat cover material 9 of this embodiment is formed into a bag shape one end side of which is open. Various members surrounded by the cover material 7 are mounted through the opening of the seat cover material 9 and are arranged in the cavity of a mold, resin foam is poured and expanded, and the seat cover terminal part on the opening side of the seat cover material 9 is covered by the seat cover fastening cover member 7c on the pillar 1 side, by which the headrest HR is integrally molded.

Next, the operation of the headrest HR configured as described above is explained.

Since the headrest HR is configured so that the headrest frame 2 is rotatably installed on the transverse shaft part 12 of the pillar 1, and is fixed by the lock mechanism 4, the headrest HR at the normal time can protect the seat occupant's head when being subjected to a shock in an raised state.

That is to say, the pillar 1 mounted on the upper part of the backrest seat S2 has the transverse shaft part 12, and the transverse shaft part 12 of the pillar 1 is rotatably engaged with the headrest frame 2. The headrest 2 is urged so as to be tilted by the headrest frame urging elements 3 at the normal time. In the raised state, the state in which the tilt is locked is formed by the lock mechanism 4 provided between the headrest frame 2 and the pillar 1. This raised state is shown in FIGS. 4 to 7. Therefore, as shown in FIG. 2, the headrest HR is in an raised state.

In the lock mechanism 4, when the engagement part 46b on one end side of the ratchet 46 is pushed by the sliding of the ratchet lever 44, the ratchet 46 rotates around the rotation axis, and the lock engagement point 46c on the other end side of the ratchet 46 moves in the direction of engaging crossingly with the engagement groove part 41a, 42a of the latch plate 41, 42.

In the raised state, the ratchet 46 is positioned in the engagement groove part 41a, 42a and comes into contact with the latch plate 41, 42, the pillar 1 and the headrest frame 2 are in a locked state, and the raised state of the headrest HR is maintained.

By operating the ratchet lever 44 against the ratchet lever urging elements 45, the engagement part 46b on one end side of the ratchet 46 is pushed, and the ratchet 46 is rotated around the rotation axis. Therefore, the ratchet 46 retracts from the engagement groove part 41a, 42a, so that the ratchet 46 comes off the engagement groove part 41a, 42a of the latch plate 41, 42. At this time, since the spring 33, which is the headrest frame urging elements 3, urges the headrest frame 2 in the tilt direction at the normal time, the headrest HR tilts around the transverse shaft part 12, by which the storage state is formed.

As described above, when the head support state in which the headrest HR is raised with respect to the backrest seat S2 is formed and when the storage state is formed by tilting the headrest HR from the head support state, in the present invention, as the lock mechanism 4, the ratchet lever 44, the latch plates 41 and 42, and the ratchets 46 are used. Also, the engagement position and the disengagement position are switched over via the ratchet 46 one end side of which engages with the engagement concave part 44b of the ratchet lever 44 and the other end side of which engages crossingly with the engagement groove part 41a, 42a of the latch plate 41, 42. Therefore, the lock mechanism 4 itself can be configured so as to be compact without requiring a wide width.

Moreover, since at least one of the engagement groove parts 41a and 42a of the latch plates 41 and 42 serving as a locking member is formed so that the upper end side is narrow, the contact point of the ratchet 46 with the latch plate 42 separates from the transverse shaft part 12 of the pillar 1. Therefore, when the lock is released, the releasing load placed by the urging force of the headrest frame urging elements 3 (the spring 33) from the rear can be decreased.

Also, at the normal time, the ratchet lever 44 is urged by the ratchet lever urging elements 45 in the direction such that the ratchet 46 is engaged with the engagement groove part 41a, 42a of the latch plate 41 42. When the ratchet lever 44 is operated against the ratchet lever urging elements 45, the ratchet 46 comes off the engagement groove part 41a, 42a, and the headrest frame 2 is tilted to the storage state by the headrest frame urging elements 3, so that the headrest HR tilts down. Therefore, the lock can be released by one operation (one action).

Furthermore, since one end side of the ratchet 46 touching the engagement concave part 44b of the ratchet lever 44 is formed into a circular shape, the ratchet 46 turns smoothly in the engagement concave part 44b of the ratchet lever 44 with respect to the movement of the ratchet lever 44. Therefore, the ratchet 46 can be engaged with and disengaged from the engagement groove part 41a, 42a of the latch plate 41, 42, so that the lock can be released exactly.

When the headrest HR in the storage state is raised to the raised state, since in the normal time, the ratchet lever 44 is urged by the ratchet lever urging elements (spring) 45, and the ratchet 46 is urged in the direction such that the ratchet 46 engages with the engagement groove part 41a, 42a of the latch plate 41, 42, if the headrest HR is raised by a hand, the ratchet 46 rotates, and the lock engagement point 46c engages with the engagement groove part 41a, 42a of the latch plate 41, 42, by which the locked state is formed.

In the above-described embodiment, the pillar 1, the latch plate 41, 42 serving as a locking member for the lock mechanism 4, and the ratchet 46 serving as a fixing member each are provided in number of two. However, the number of these members may be one or may be three or more. Needless to say, the number of engagement concave part 44b of the ratchet lever 44 serving as an operation lever may be one or may be plural accordingly.

DESCRIPTION OF SYMBOLS 1 pillar
2 headrest frame
3 headrest frame urging elements
4 lock mechanism
7 cover material
7a front cover member
7b rear cover member
7c seat cover fastening cover member
7d garnish
8 pad material
9 seat cover material
11 leg part
12 transverse shaft part
21 main frame
21a lower assembly concave part
21b hemming crimping part
21c folded wall part
21d cut-away part
21e boss part
21f protruding part
21g jutting-out part
21h, 21i, tongue piece
21j
21k play preventing piece
21m cut-away part
21p embossed part
21r hemming crimping part
21s slit
21t side part
22 sub frame
22a lower assembly concave part
22b hemming crimping part
22c folded part
22d expanding part
22e boss part
22f protruding part
22g blanked drawn part
22h hole
22k urge receiving part
22p embossed part
31 shaft
32 damper
33 spring
33a one end
33b the other end
41, 42 latch plate
41a, 42a engagement groove part
41b, 42b outer periphery part
41c, 42c stopper part
41d, 42d shaft insertion hole
41e, 42e stopper part
41p, 42p stopper part
42f upper end part
42g groove bottom
44 ratchet lever
44a plate main body
44b, 44b engagement concave part
44c movement locking part
44d locking part
44e end part side
44e end part side
44f, 44f jutting-out part
45 ratchet lever urging elements (spring)
46 ratchet
46a rotation hole
46b engagement part
46c lock engagement point
46d locus
101, 102 rivet
101a, central part
102a
101b, caulking part
102b
S vehicle seat
S1 seating seat
S2 backrest seat
HR headrest

The invention claimed is:

1. A headrest having a head support state in which the headrest is raised with respect to a backrest seat and tilted from the head support state to a storage state, comprising:
    a support member mounted on an upper part of the backrest seat;
    a frame engaged rotatably with the support member;
    frame urging elements for urging the frame to one side; and
    a lock mechanism provided between the frame and the support member, wherein
    the lock mechanism comprises:
    a locking member disposed on the support member and formed with an engagement groove part;
    an operation lever having a concave part formed so as to be directed toward a support member side and being movable; and
    a fixing member pivotally supported on the frame rotatably and disposed so as to be crossingly engaged with and disengaged from the engagement groove part of the locking member along with a movement of the operation lever, and the engagement groove part of the locking member is formed so that its upper end side is narrow.

2. A headrest having a head support state in which the headrest is raised with respect to a backrest seat and tilted from the head support state to a storage state, comprising:
a pillar having a transverse shaft part and mounted on an upper part of the backrest seat;
a headrest frame rotatably engaged with the transverse shaft part of the pillar by combining a main frame and a sub frame;
headrest frame urging elements for urging the headrest frame to one side; and
a lock mechanism provided between the headrest frame and the pillar,
wherein
the lock mechanism comprises:
a latch plate disposed on the transverse shaft part of the pillar and formed with an engagement groove part along the transverse shaft part;
a ratchet lever provided with an engagement concave part formed so as to be directed toward the pillar side and sliding in a transverse direction; and
a ratchet, one end side of which is engaged with the engagement concave part of the ratchet lever, and an other end side of which can be engaged crossingly with the engagement groove part of the latch plate,
an engagement position at which the ratchet is positioned in the engagement groove part of the latch plate and a disengagement position at which the ratchet comes off the engagement groove part can be switched over, and
the engagement groove part of the latch plate is formed so that the upper end side thereof is narrow.

3. The headrest according to claim 2, wherein the latch plate is in contact with the ratchet on the upper end side formed so as to be narrow of the engagement groove part, and a distance from the transverse shaft part of the pillar to the contacting portion is longer than a distance from the transverse shaft part of the pillar to any other portion of the ratchet positioned in the engagement groove part.

4. The headrest according to claim 2, wherein when the ratchet engages with the engagement groove part, the bottom part of the engagement groove part of the latch plate is positioned above the end part of the ratchet.

5. The headrest according to claim 2, wherein at least two latch plates are formed, and the engagement groove part of at least one latch plate is formed so that the upper end side thereof is narrow.

6. The headrest according to claim 2, wherein at least two latch plates are formed, and the engagement groove part of the latch plate is formed so that the width thereof is different.

7. The headrest according to claim 2, wherein the headrest further comprises an outer peripheral surface of the latch plate on which the ratchet slides, and a stopper part formed in the engagement groove part of the latch plate, capable of making contact with the ratchet before the ratchet enters into the engagement groove part, and the ratchet enters into and engages with the engagement groove part of the latch plate after coming into contact with the stopper part.

8. The headrest according to claim 2, wherein the latch plate is formed with a shaft insertion hole for inserting the shaft.

9. The headrest according to claim 2, wherein the lock mechanism has ratchet lever urging elements for urging the ratchet lever so that the ratchet is urged in the engagement groove part direction of the latch plate, and by operating the ratchet lever against the ratchet lever urging elements, the ratchet is taken away from the engagement groove part of the latch plate.

10. A headrest having a head support state in which the headrest is raised with respect to a backrest seat and tilted from the head support state to a storage state, comprising:
a pillar having a transverse shaft part and mounted on an upper part of the backrest seat;
a headrest frame rotatably engaged with the transverse shaft part of the pillar by combining a main frame and a sub frame;
headrest frame urging elements for urging the headrest frame to one side; and
a lock mechanism provided between the headrest frame and the pillar,
wherein
the lock mechanism comprises:
a latch plate disposed on the transverse shaft part of the pillar and formed with an engagement groove part along the transverse shaft part;
a ratchet lever provided with an engagement concave part formed so as to be directed toward the pillar side and sliding in the transverse direction; and
a ratchet one end side of which is engaged with the engagement concave part of the ratchet lever and an other side of which can be engaged crossingly with the engagement groove part of the latch plate, and
on an outer peripheral surface of the latch plate, a stopper part coming into contact with the ratchet when the headrest is rotated and stored is formed.

11. The headrest according to claim 10 wherein when the ratchet engages with the engagement groove part, the bottom part of the engagement groove part of the latch plate is positioned above the end part of the ratchet.

12. The headrest according to claim 10 wherein at least two latch plates are formed, and the engagement groove part of at least one latch plate is formed so that the upper end side thereof is narrow.

13. The headrest according to claim 10 wherein at least two latch plates are formed, and the engagement groove part of the latch plate is formed so that the width thereof is different.

14. The headrest according to claim 10 wherein the headrest further comprises an outer peripheral surface of the latch plate on which the ratchet slides, and a stopper part formed in the engagement groove part of the latch plate, capable of making contact with the ratchet before the ratchet enters into the engagement groove part, and the ratchet enters into and engages with the engagement groove part of the latch plate after coming into contact with the stopper part.

15. The headrest according to claim 10 wherein the latch plate is formed with a shaft insertion hole for inserting the shaft.

16. The headrest according to claim 10 wherein the lock mechanism has ratchet lever urging elements for urging the ratchet lever so that the ratchet is urged in the engagement groove part direction of the latch plate, and by operating the ratchet lever against the ratchet lever urging elements, the ratchet is taken away from the engagement groove part of the latch plate.

17. A headrest having a head support state in which the headrest is raised with respect to a backrest seat and tilted from the head support state to a storage state, comprising:
a pillar having a transverse shaft part and mounted on an upper part of the backrest seat;
a headrest frame rotatably engaged with the transverse shaft part of the pillar by combining a main frame and a sub frame;

headrest frame urging elements for urging the headrest frame to one side; and a lock mechanism provided between the headrest frame and the pillar, wherein the lock mechanism comprises:

a latch plate disposed on the transverse shaft part of the pillar and formed with an engagement groove part along the transverse shaft part;

a ratchet lever provided with an engagement concave part formed so as to be directed toward the pillar side and sliding in a transverse direction; and a ratchet one end side of which is engaged with the engagement concave part of the ratchet lever and an other end side of which can be engaged crossingly with the engagement groove part of the latch plate, and on a surface on a lower side of the latch plate, a stopper part consisting of a pushing-out part which juts out is formed.

18. The headrest according to claim 17 wherein at least two latch plates are formed, and the engagement groove part of at least one latch plate is formed so that the upper end side thereof is narrow.

19. The headrest according to claim 17 wherein at least two latch plates are formed, and the engagement groove part of the latch plate is formed so that the width thereof is different.

20. The headrest according to claim 17 wherein the headrest further comprises an outer peripheral surface of the latch plate on which the ratchet slides, and a stopper part formed in the engagement groove part of the latch plate, capable of making contact with the ratchet before the ratchet enters into the engagement groove part, and the ratchet enters into and engages with the engagement groove part of the latch plate after coming into contact with the stopper part.

21. The headrest according to claim 17 wherein the latch plate is formed with a shaft insertion hole for inserting the shaft.

22. The headrest according to claim 17 wherein the lock mechanism has ratchet lever urging elements for urging the ratchet lever so that the ratchet is urged in the engagement groove part direction of the latch plate, and by operating the ratchet lever against the ratchet lever urging elements, the ratchet is taken away from the engagement groove part of the latch plate.

23. A vehicle seat provided with a headrest having a head support state in which the headrest is raised with respect to a backrest seat and tilted from the head support state to a storage state, the headrest comprising:

a pillar having a transverse shaft part and mounted on an upper part of the backrest seat;

a headrest frame rotatably engaged with the transverse shaft part of the pillar by combining a main frame and a sub frame;

headrest frame urging elements for urging the headrest frame to one side; and a lock mechanism provided between the headrest frame and the pillar, the lock mechanism comprises:

a latch plate disposed on the transverse shaft part of the pillar and formed with an engagement groove part along the transverse shaft part;

a ratchet lever provided with an engagement concave part formed so as to be directed toward the pillar side and sliding in a transverse direction; and a ratchet one end side of which is engaged with the engagement concave part of the ratchet lever and an other end side of which can be engaged crossingly with the engagement groove part of the latch plate, an engagement position at which the ratchet is positioned in the engagement groove part of the latch plate and a disengagement position at which the ratchet comes off the engagement groove part can be switched over, and the engagement groove part of the latch plate is formed so that its upper end side thereof is narrow.

24. The vehicle seat provided with a headrest according to claim 23, wherein the latch plate is in contact with the ratchet on the upper end side formed so as to be narrow of the engagement groove part, and a distance from the transverse shaft part of the pillar to the contacting portion is longer than a distance from the transverse shaft part of the pillar to any other portion of the ratchet positioned in the engagement groove part.

25. A vehicle seat provided with a headrest having a head support state in which the headrest is raised with respect to a backrest seat and being tilted from the head support state to a storage state, the headrest comprising:

a pillar having a transverse shaft part and mounted on an upper part of the backrest seat;

a headrest frame rotatably engaged with the transverse shaft part of the pillar by combining a main frame and a sub frame;

headrest frame urging elements for urging the headrest frame to one side; and a lock mechanism provided between the headrest frame and the pillar, the lock mechanism comprising:

a latch plate disposed on the transverse shaft part of the pillar and formed with an engagement groove part along a transverse shaft part;

a ratchet lever provided with an engagement concave part formed so as to be directed toward the pillar side and sliding in a transverse direction; and a ratchet one end side of which is engaged with the engagement concave part of the ratchet lever and an other end side of which can be engaged crossingly with the engagement groove part of the latch plate, and on an outer peripheral surface of the latch plate, a stopper part coming into contact with the ratchet when the headrest is rotated and stored is formed.

26. A vehicle seat provided with a headrest having a head support state in which the headrest is raised with respect to a backrest seat and tilted from the head support state to a storage state, the headrest comprising:

a pillar having a transverse shaft part and mounted on an upper part of the backrest seat;

a headrest frame rotatably engaged with the transverse shaft part of the pillar by combining a main frame and a sub frame;

headrest frame urging elements for urging the headrest frame to one side; and a lock mechanism provided between the headrest frame and the pillar, the lock mechanism comprises:

a latch plate disposed on the transverse shaft part of the pillar and formed with an engagement groove part along the transverse shaft part;

a ratchet lever provided with an engagement concave part formed so as to be directed toward the pillar side and sliding in a transverse direction; and a ratchet one end side of which is engaged with the engagement concave part of the ratchet lever and an other end side of which can be engaged crossingly with the engagement groove part of the latch plate, and on a surface on a lower side of the latch plate, a stopper part consisting of a pushing-out part which juts out is formed.

* * * * *